United States Patent
Buttry et al.

(10) Patent No.: US 10,700,382 B2
(45) Date of Patent: *Jun. 30, 2020

(54) CHELATING IONIC LIQUIDS FOR MAGNESIUM BATTERY ELECTROLYTES AND SYSTEMS

(71) Applicant: ARIZONA BOARD OF REGENTS ON BEHALF OF ARIZONA STATE UNIVERSITY, Scottsdale, AZ (US)

(72) Inventors: Daniel A. Buttry, Tempe, AZ (US); Tylan S. Watkins, Tempe, AZ (US); Joseph Rheinhardt, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,937

(22) Filed: Nov. 6, 2018

(65) Prior Publication Data
US 2019/0074548 A1 Mar. 7, 2019

Related U.S. Application Data

(63) Continuation of application No. 15/942,741, filed as application No. PCT/US2016/059712 on Oct. 31, 2016, now Pat. No. 10,147,971.
(Continued)

(51) Int. Cl.
H01M 10/054 (2010.01)
H01M 10/0567 (2010.01)
(Continued)

(52) U.S. Cl.
CPC ..... *H01M 10/0569* (2013.01); *H01M 10/054* (2013.01); *H01M 10/0567* (2013.01);
(Continued)

(58) Field of Classification Search
None
See application file for complete search history.

(56) References Cited

U.S. PATENT DOCUMENTS 3,642,540 A 2/1972 Argent
3,758,344 A 9/1973 Oliapuram
(Continued)

FOREIGN PATENT DOCUMENTS

EP 2023434 A 2/2009
JP 2008293678 A 12/2008
(Continued)

OTHER PUBLICATIONS

Su, S. et al., "A novel rechargeable battery with a magnesium anode, a titanium dioxide cathode, and a magnesium borohydride/ tetraglyme electrolyte", Chemical Communications, Jan. 2015, 51, 2641-2644.
(Continued)

*Primary Examiner* — Haroon S. Sheikh
(74) *Attorney, Agent, or Firm* — Snell & Wilmer L.L.P.

(57) ABSTRACT

Ionic liquids suitable for use in magnesium batteries are disclosed. In an exemplary embodiment, a rechargeable magnesium battery comprises an anode electrode, a cathode electrode, and a chelating ionic liquid solution in contact therewith. The chelating ionic liquid may comprise at least one cation, at least one anion, and at least one soluble, magnesium salt. The magnesium salt may comprise $MgX_2$, wherein X comprises at least one of Cl—, Br—, I—, TFSI—, FSI—, $ClO_4$—, $BF_4$—, $PF_6$—, $RSO_3$— (wherein R consists of at least one of an alkyl or aryl group), $RCO_2$— (wherein R consists of at least one of an alkyl or aryl group), alkyl borides, alkyl borates, $AlCl_4$—, $AlX_aR_b$— (wherein the sum of subscripts a and b is 4, X consists of a halide, and
(Continued)

R consists of at least one of an alkyl or aryl group), carboranes, or hexamethyldisilazide.

16 Claims, 23 Drawing Sheets

Related U.S. Application Data

(60) Provisional application No. 62/240,678, filed on Oct. 13, 2015, provisional application No. 62/297,261, filed on Feb. 19, 2016.

(51) Int. Cl.
H01M 10/0568 (2010.01)
H01M 10/0569 (2010.01)

(52) U.S. Cl.
CPC .......... H01M 10/0568 (2013.01); H01M 2300/0022 (2013.01); H01M 2300/0045 (2013.01)

(56) References Cited

U.S. PATENT DOCUMENTS

| | | |
|---|---|---|
| 4,341,847 A | 7/1982 | Sammells |
| 4,343,869 A | 8/1982 | Oltman |
| 4,397,730 A | 8/1983 | Bindra |
| 5,731,101 A | 3/1998 | Sherif |
| 5,827,602 A | 10/1998 | Koch |
| 5,855,809 A | 1/1999 | Angell |
| 6,326,104 B1 | 12/2001 | Caja |
| 6,500,575 B1 | 12/2002 | Shiue |
| 6,573,405 B1 | 6/2003 | Abbott |
| 7,479,353 B2 | 1/2009 | Hollenkamp |
| 7,829,212 B2 | 11/2010 | Visco |
| 7,867,658 B2 | 1/2011 | Angell |
| 7,960,061 B2 | 6/2011 | Jost |
| 7,965,062 B2 | 6/2011 | Kishi |
| 8,895,197 B2 | 11/2014 | Friesen |
| 9,184,478 B2 | 11/2015 | Friesen |
| 2004/0157101 A1 | 8/2004 | Smedley |
| 2005/0141740 A1 | 6/2005 | Preves |
| 2006/0204835 A1 | 9/2006 | Kelsey |
| 2007/0026295 A1 | 2/2007 | Angell |
| 2007/0031714 A1 | 2/2007 | Huang |
| 2007/0051620 A1 | 3/2007 | Visco |
| 2007/0212583 A1 | 9/2007 | Johnson |
| 2007/0212615 A1 | 9/2007 | Jost |
| 2007/0243449 A1 | 10/2007 | Sotomura |
| 2007/0278109 A1 | 12/2007 | Kendig |
| 2008/0008930 A1 | 1/2008 | Matsumoto |
| 2008/0038641 A1 | 2/2008 | Visco |
| 2008/0096074 A1 | 4/2008 | Wu |
| 2009/0239146 A1 | 9/2009 | Nakagawa |
| 2013/0209894 A1 | 8/2013 | Ryu et al. |
| 2013/0236764 A1 | 9/2013 | Hu et al. |
| 2014/0211370 A1 | 7/2014 | Seymour |
| 2014/0302400 A1 | 10/2014 | Shao et al. |
| 2015/0072250 A1 | 3/2015 | Mohtadi |
| 2016/0049667 A1 | 2/2016 | Friesen |

FOREIGN PATENT DOCUMENTS

| | | |
|---|---|---|
| WO | 2009013629 A2 | 1/2009 |
| WO | 2010132357 A1 | 11/2010 |
| WO | 2011143368 A1 | 11/2011 |

OTHER PUBLICATIONS

Su, Y. et al., "The Electrode/Ionic Liquid Interface: Electric Double Layer and Metal Electrodeposition", ChemPhysChem, Sep. 2010 (first published Aug. 2010), 11(13), pp. 2764-2778.

Tsuda, T. et al., "Electrochemistry of Room-Temperature Ionic Liquids and Melts", Modern Aspects of Electrochemistry, 2009, No. 45, pp. 63-174.

Tuerxun, F. et al., "High concentration magnesium borohydride/tetraglyme electrolyte for rechargeable magnesium batteries", Journal of Power Sources, Feb. 2015 (available online 2014), 276, pp, 255-261.

Tutusaus, O. et al., "An Efficient Halogen-Free Electrolyte for Use in Rechargeable Magnesium Batteries", Angewandte Chemie International Edition, Jun. 2015 (first published May 2015), 54(27), pp. 7900-7904.

Ueno, K. et al., "Anionic Effects on Solvate Ionic Liquid Electrolytes in Rechargeable Lithium-Sulfur Batteries", Journal of Physical Chemistry C, Sep. 2013, 117(40), pp. 20509-20516.

Ueno, K. et al., "Glyme-Lithium Salt Equimolar Molten Mixtures: Concentrated Solutions or Solvate Ionic Liquids?", Journal of Physical Chemistry B, Aug. 2012, 116(36), pp. 11323-11331.

Umebayashi, Y. et al., "Lithium Ion Solvation in Room-Temperature Ionic Liquids Involving Bis (trifluoromethanesulfonyl) Imide Anion Studied by Raman Spectroscopy and DFT Calculations", Journal of Physical Chemistry B, Oct. 2007,111(45), pp. 13028-13032.

Umebayashi, Y. et al., "Raman Spectroscopic Studies and Ab Inito Calculations on Conformational Isomerism of 1-Butyl-3-methylimidazolium Bis-(trifluoromethanesulfonyl)amide Solvated to a Lithium Ion in Ionic Liquids: Effects of the Second Solvation Sphere of the Lithium Ion", Journal of Physical Chemistry B, Apr. 2010, 114(19), pp. 6513-6521.

Umecky, T. et al., "Ionization condition of lithium ionic liquid electrolytes under the solvation effect of liquid and solid solvents", Journal of Physical Chemistry B, Feb. 2008, 112(11), pp. 3357-3364.

USPTO, Final Office Action for U.S. Appl. No. 12/776,962, dated Apr. 24, 2014, 36 pages.

USPTO, Final Office Action for U.S. Appl. No. 12/776,962, dated Oct. 26, 2012, 25 pages.

USPTO, Final Office Action for U.S. Appl. No. 13/105,794, dated Jun. 21, 2013, 40 pages.

USPTO, Final Office Action for U.S. Appl. No. 14/862,376, dated Oct. 30, 2018, 12 pages.

USPTO, Non-Final Office Action for U.S. Appl. No. 12/776,962, dated Apr. 27, 2012, 19 pages.

USPTO, Non-Final Office Action for U.S. Appl. No. 12/776,962, dated Oct. 28, 2013, 30 pages.

USPTO, Non-Final Office Action for U.S. Appl. No. 13/105,794, dated Dec. 12, 2012, 50 pages.

USPTO, Non-Final Office Action for U.S. Appl. No. 13/105,794, dated Aug. 28, 2014, 32 pages.

USPTO, Non-Final Office Action for U.S. Appl. No. 14/862,376, dated Mar. 20, 2018, 11 pages.

Vardar, G. et al., "Electrochemistry of Magnesium Electrolytes in Ionic Liquids for Secondary Batteries", ACS Applied Materials & Interfaces, Sep. 2014, 6(20), pp. 18033-18039.

Venkata Narayanan, N. et al., "Magnesium ion conducting, room temperature molten electrolytes", Electrochemistry Communications, Oct. 2009 (available online Aug. 2009), 11(10), pp. 2027-2031.

Venkata Narayanan, N. et al., "Physicochemical, spectroscopic and electrochemical characterization of magnesium ion-conducting, room temperature, ternary molten electrolytes", Journal of Power Sources, Jul. 2010 (available online Feb. 2010), 195(13), pp. 4356-4364.

Wang, F. et al., "A novel electrolyte system without a Grignard reagent for rechargeable magnesium batteries", Chemical Communications, Sep. 2012, 48(87), pp. 10763-10765.

Wang, P. et al., "Mixed ionic liquids as electrolyte for reversible deposition and dissolution of magnesium", Surface and Coatings Technology, Dec. 2006 (available online May 2006), 201(6), pp. 3783-3787.

Watkins T. et al., "Designer Ionic Liquids for Reversible Electrochemical Deposition/Dissolution of Magnesium", Journal of the American Chemical Society, 2016 (published Dec. 2015), 138, pp. 641-650.

(56) References Cited

OTHER PUBLICATIONS

Watkins, T. et al., "Determination of Mg2+ Speciation in a TFSI-Based Ionic Liquid With and Without Chelating Ethers Using Raman Spectroscopy", Journal of Physical Chemistry B, May 2015, 119(23), pp. 7003-7014.
Watkins, T., "Magnesium Battery Electrolytes in Ionic Liquids", Dissertation, Arizona State University, May 2016, 193 pages.
Welton, T., "Room-Temperature Ionic Liquids. Solvents for Synthesis and Catalysis", Chemical Review, Jul. 1999, 99 (8), pp. 2071-2084.
Xu, W. et al., "Solvent-Free Electrolytes with Aqueous Solution-Like Conductivities", Science, Oct. 2003, 302(5644), pp. 422-425.
Xue, L. et al., "Synthesis and structures of alkali metal salts of bis[(trifluoromethyl)sulfonyl]imide", Solid State Sciences, Nov.-Dec. 2002, 4(11-12), pp. 1535-1545.
Yagi, S. et al., "Electrochemical Stability of Magnesium Battery Current Collectors in a Grignard Reagent-Based Electrolyte", Journal of The Electrochemical Society, Jan. 2013, 160(3), pp. C83-C88, (Paper 355 presented at the Honolulu, Hawaii, Meeting of the Society, Oct. 7-12, 2012).
Yoo, H. et al., "Mg rechargeable batteries: an on-going challenge", Energy & Environmental Science, Aug. 2013 (first published May 2013), 6(8), pp. 2265-2279.
Yoshida, K. et al., "Change from Glyme Solutions to Quasi-ionic Liquids for Binary Mixtures Consisting of Lithium Bis (trifluoromethanesulfonyl)amide and Glymes", Journal of Physical Chemsitry C, Aug. 2011, 115(37), pp. 18384-18394.
Yoshida, K. et al., "Correlation between Battery Performance and Lithium Ion Diffusion in Glyme-Lithium Bis (trifluoromethanesulfonyl)amide Equimolar Complexes", Journal of the Electrochemical Society, Jul. 2012, 159(7), pp. A1005-A1012.
Yoshida, K. et al., "Oxidative-Stability Enhancement and Charge Transport Mechanism in Glyme-Lithium Salt Equimolar Complexes", Journal of the American Chemical Society, Jul. 2011, 133(33), pp. 13121-13129.
Yoshida, M. et al., "Solvate Ionic Liquids and Their Application to Lithium Batteries: Glyme-Lithium Bis(fluorosulfonyl) amide Equimolar Complexes", MRS Proceedings, 2012, 6 pages, DOI: 10.1557/opl.2012.1517.
Yoshimoto, N. et al., "Mixed electrolyte consisting of ethylmagnesiumbromide with ionic liquid for rechargeable magnesium electrode", Journal of Power Sources, Apr. 2010 (available online Nov. 2009), 195(7), pp. 2096-2098.
Zhang, C. et al., "Chelate Effects in Glyme/Lithium Bis(trifluoromethanesulfonyl)amide Solvate Ionic Liquids, Part 2: Importance of Solvate-Structure Stability for Electrolytes of Lithium Batteries", Journal of Physical Chemistry, Jul. 2014, 118(31), pp. 17362-17373.
Zhang, C. et al., "Chelate Effects in Glyme/Lithium Bis(trifluoromethanesulfonyl)amide Solvate Ionic Liquids. I. Stability of Solvate Cations and Correlation with Electrolyte Properties", Journal of Physical Chemistry B, Apr. 2014, 118(19), pp. 5144-5153.
Zhang, S. et al., "Physical Properties of Ionic Liquids: Database and Evaluation", Journal of Physical and Chemical Reference Data, Oct. 2006, 35(4), pp. 1475-1517.
Zhao, Q. et al., "Reversible Deposition and Dissolution of Magnesium from Imidazolium-Based Ionic Liquids", International Journal of Electrochemistry, 2012, vol. 2012, article ID 701741, 8 pages.
Zhou, Q. et al., "Phase Behavior and Crystalline Phases of Ionic Liquid-Lithium Salt Mixtures with 1-Alkyl-3-methylimidazolium Salts", Chemistry of Materials, Feb. 2010 (published on web Dec. 2009), 22(3), pp. 1203-1208.
Zhou, Q. et al., "Phase Behavior of Ionic Liquid-LiX Mixtures: Pyrrolidinium Cations and TFSI—Anions—Linking Structure to Transport Properties", Chemistry of Materials, Sep. 2011, 23(19), pp. 4331-4337.

Zu, C. et al., "Thermodynamic analysis on energy densities of batteries", Energy & Environmental Science, Apr. 2011, 4, 2614-2624.
International Search Report and the Written Opinion of the International Application No. PCT/US2016/059712 dated Feb. 14, 2017.
Amir, C. et al., "Progress in nonaqueous magnesium electrochemistry", Journal of Power Sources, Dec. 2007 (available online Jun. 2007), 174(2), pp. 1234-1240.
Angell, A. et al., "Ionic Liquids: Past, present and future", Faraday Discussions, 2012 (first published Nov. 2011), 154, pp. 9-27.
Angell, A., "A New Class of Molten Salt Mixtures the Hydrated Dipositive Ion as an Independent Cation Species", Journal of the Electrochemical Society, Dec. 1965, 112(12), pp. 1224-1227.
Appetecchi, G. et al., "Synthesis of Hydrophobic Ionic Liquids for Electrochemical Applications", Journal of the Electrochemical Society, Jul. 2006, 153(9), pp. A1685-A1691.
Armand, M. et al., "Ionic-liquid materials for the electrochemical challenges of the future", Nature Materials, Aug. 2009 (published online Jul. 2009), 8, pp. 621-629.
Aurbach, D. et al., "A short review of failure mechanisms of lithium metal and lithiated graphite anodes in liquid electrolyte solutions", Solid State Ionics, Jun. 2002 (available online Mar. 2002), 148(3-4), pp. 405-416.
Aurbach, D. et al., "Electrolyte Solutions for Rechargeable Magnesium Batteries Based on Organomagnesium Chloroaluminate Complexes", Journal of the Electrochemical Society, 2002 (available electronically Dec. 2001), 149 (2), pp. A115-A121.
Aurbach, D. et al., "Magnesium Deposition and Dissolution Processes in Ethereal Grignard Salt Solutions Using Simultaneous EQCM-EIS and In Situ FTIR Spectroscopy", Electrochemical and Solid-State Letters, 2000 (available electronically Nov. 1999), 3(1), pp. 31-34.
Aurbach, D. et al., "On the Mechanisms of Reversible Magnesium Deposition Processes", Journal of the Electrochemical Society, Aug. 2001, 148(9), pp. A1004-A1014.
Aurbach, D. et al., "Progress in Rechargeable Magnesium Battery Technology", Advanced Materials, 19(23), pp. 4260-4267.
Aurbach, D. et al., "Prototype systems for rechargeable magnesium batteries", Nature, Oct. 2000, 407(6805), pp. 724-727.
Aurbach, D. et al., "Spectroelectrochemical studies of magnesium deposition by in situ FTIR spectroscopy", May 2001, 3(5), pp. 252-261.
Aurbach, D. et al., "The Study of Reversible Magnesium Deposition by in Situ Scanning Tunneling Microscopy", Electrochemical and Solid-State Letters, Jun. 2001, 4(8), pp. A113-A116.
Bakker, A. et al., "Contact ion pair formation and ether oxygen coordination in the polymer electrolytes M[N (CF3SO2)2]2PEOn for M=Mg, Ca, Sr and Ba", Polymer, 1995, 36(23), pp. 4371-4378.
Balasubrahmanyam, K., "Raman Spectra of Liquid MgCl2 and Liquid MgCl2-KCl System", Journal of Chemical Physics, May 1966, 44(9), pp. 3270-3273.
Bard, A. et al., "Chapter 12: Electrode Reactiosn with Coupled Homogenous Chemical Reactions", in Electrochemical Methods: Fundamentals and Applications, 2001, John Wiley & Sons, Inc., pp. 471-553.
Bard, A. et al., "Chapter 6: Potential Sweep Methods", in Electrochemical Methods: Fundamentals and Applications, 2001, John Wiley & Sons, Inc., pp. 226-424.
Bayley, P. et al., "Undoing Lithium Ion Association in Ionic Liquids through the Complexation by Oligoethers", Journal of Physical Chemistry, Aug. 2010, 114(48), pp. 20569-20576.
Bian, P. et al., "A novel thiolate-based electrolyte system for rechargeable magnesium batteries", Electrochimica Acta, Mar. 2014 (available online Jan. 2014), 121, pp. 258-263.
Bock, C. et al., "Coordination of water to magnesium cations", Inorganic Chemistry, 1994, 33(3), pp. 419-429.
Borodin, O. et al., "Li+ Cation Environment, Transport, and Mechanical Properties of the LiTFSI Doped N-Methyl-N-alkylpyrrolidinium+ TFSI-Ionic Liquids", Journal of Physical Chemistry B, Aug. 2006, 110(34), pp. 16879-16886.
Borresen, B. et al., "Electrodeposition of magnesium from halide melts—charge transfer and diffusion kinetics", Electrochemica Act, 1997, 42(10), pp. 1613-1622.

(56) References Cited

OTHER PUBLICATIONS

Bradley, M. et al., "High-pressure Raman spectra of the acetone carbon-carbon stretch in binary liquid mixtures with methanol", Journal of Physical Chemistry, 1992, 96(1), pp. 75-79.
Brouillette, D. et al., "Stable solvates in solution of lithium bis(trifluoromethylsulfone)imide in glymes and other aprotic solvents: Phase diagrams, crystallography and Raman spectroscopy", Physical Chemistry Chemical Physics, Nov. 2002, 4, pp. 6063-6071.
Bucur, C. et al., "Confession of a Magnesium Battery", Journal of Physical Chemistry Letters, Aug. 2015, 6(18), pp. 3578-3591.
Capwell, R., "Raman spectra of crystalline and molten MgCl2", Chemical Physics Letters, Jan. 1972, 12(3), pp. 443-446.
Carter, T. et al., "Boron clusters as highly stable magnesium-battery electrolytes", Mar. 2014 (epub Feb. 2014), 53 (12), pp. 3173-3177.
Castriota, M. et al., "Raman Investigation of the Ionic Liquid N-Methyl-N-propylpyrrolidinium Bis (trifluoromethanesulfonyl)imide and Its Mixture with LiN(SO2CF3)2", Journal of Physical Chemistry A, 2005 (published on web Dec. 2004), 109(1), pp. 92-96.
Chang, J. et al., "Synergetic Role of Li+ during Mg Electrodeposition/Dissolution in Borohydride Diglyme Electrolyte Solution: Voltammetric Stripping Behaviors on a Pt Microelectrode Indicative of Mg—Li Alloying and Facilitated Dissolution", ACS Applied Materials & Interfaces, Jan. 2015, 7(4), pp. 2494-2502.
Cheek, G. et al., "Studies on the Electrodeposition of Magnesium in Ionic Liquids", Journal of the Electrochemical Society, 2008 (available electronically Nov. 2007), 155(1), pp. D91-D95.
Choquette, Y. et al., "Sulfamides and Glymes as Aprotic Solvents for Lithium Batteries", Journal of Electrochemical Society, 1998, 145(10), pp. 3500-3507.
Connor, J. et al., "Electrodeposition of Metals from Organic Solutions", Journal of the Electrochemical Society, 1957, 104(1), pp. 38-41.
Dalton, D. et al., "Static Compression of Tetramethylammonium Borohydride", Journal of Physical Chemistry, Sep. 2011, 115(40), pp. 11033-11038.
Davies, N. et al., "Spectroscopic studies on derivatives of aluminium borohydride", Journal of the Chemical Society A: Inorganic, Physical, Theoretical, 1968, pp. 2269-2272.
Dillon, R. et al., "Influence of cation size on ionic glass formation and ionic conductivity", Solid State Ionics, Jul. 2000, 132(1-2), pp. 93-99.
Dillon, R. et al., "Influence of the Anion on the Formation of Amorphous Ionically Conducting Lithium Salt Complexes with 18-C-6 and 2.2.2-Cryptand Macrocycles", Jul. 2001, 13(8), pp. 2516-2522.
Dillon, R. et al., "Ion Transport in Cryptand and Crown Ether Lithium Salt Complexes", Chemistry of Materials, Oct. 1999, 11(11), pp. 3296-3301.
Dobbelin, M. et al., "Synthesis of Pyrrolidinium-Based Poly(ionic liquid) Electrolytes with Poly(ethylene glycol) Side Chains", Chemistry of Materials, Mar. 2012, 24(9), pp. 1583-1590.
Doe, R. et al., "Novel, electrolyte solutions comprising fully inorganic salts with high anodic stability for rechargeable magnesium batteries", Chemical Communications, 2014 (first published Nov. 2013), 50(2), pp. 243-245.
Duluard, S. et al., "Lithium solvation and diffusion in the 1-butyl-3-methylimidazolium bis(trifluoromethanesulfonyl) imide ionic liquid", Journal of Raman Spectroscopy, Feb. 2008, 39, pp. 627-632.
Emery, A. et al., "Raman Spectroscopy in Liquid Ammonia Solutions. Vibrational Frequencies and Force Constants for Isotopic Species of the Borohydride Ion Having Tetrahedral Symmetry", Journal of Chemical Physics, Jun. 1958, 28 (6), pp. 1029-1032.
Endres, F. et al.,"Air and water stable ionic liquids in physical chemistry", Physical Chemisry Chemical Physics, Mar. 2006, 8(18), pp. 2101-2116.
Endres, F. et al., "Physical chemistry of ionic liquids", Physical Chemistry Chemical Physics, Jan. 2010, 12, p. 1648.

Evans, R. et al., "Electroreduction of Oxygen in a Series of Room Temperature Ionic Liquids Composed of Group 15-Centered Cations and Anions", Journal of Physical Chemistry B, May 2004, 108(23), pp. 7878-7886.
Evans, W. et al., "The Decomposition Voltage of Grignard Reagents in Ether Solution", Journal of the American Chemical Society, Mar. 1935, 57(3), pp. 489-490.
Fedorov, M. et al., "Ionic Liquids at Electrified Interfaces", Chemical Reviews, Mar. 2014, 114(5), pp. 2978-3036.
Ferrari, S. et al., "A binary ionic liquid system composed of N-methoxyethyl-N-methylpyrrolidinium bis (trifluoromethanesulfonyl)-imide and lithium bis(trifluoromethanesulfonyl)imide: A new promising electrolyte for lithium batteries", Journal of Power Sources, Oct. 2009 (available online Dec. 2008), 194(1), pp. 45-50.
Fujii, K. et al., "Conformational Equilibrium of Bis(trifluoromethanesulfonyl) Imide Anion of a Room-Temperature Ionic Liquid: Raman Spectroscopic Study and DFT Calculations", Journal of Physical Chemistry, Apr. 2006, 110(16), pp. 8179-8183.
Fujii, K. et al., "Solvation structures of some transition metal(II) ions in a room-temperature ionic liquid, 1-ethyl-3-methylimidazolium bis(trifluoromethanesulfonyl)amide", Analytical Sciences, Oct. 2008, 24(10), pp. 1377-1380.
Fukutsuka, T. et al., "New Magnesium-ion Conductive Electrolyte Solution Based on Triglyme for Reversible Magnesium Metal Deposition and Dissolution at Ambient Temperature", Chemistry Letters, Aug. 2014, 43(11), pp. 1788-1790.
Gaddum, L. et al., "The Electrolysis of Grignard Solutions", Journal of the American Chemical Society, May 1927, 49 (5), pp. 1295-1299.
Galinski, M. et al., "Ionic liquids as electrolytes", Electrochimica Acta, Aug. 2006 (available online Apr. 2006), 51(26), pp. 5567-5580.
Ganapatibhotla, L. et al., "PEGylated Imidazolium Ionic Liquid Electrolytes: Thermophysical and Electrochemical Properties", Chemistry of Materials, Nov. 2010, 22(23), pp. 6347-6360.
Gao, X. et al., "Multi-electron reaction materials for high energy density batteries", Energy & Environmental Science, Feb. 2010 (first published Oct. 2009), 3(2), pp. 174-189.
Giffin, G. et al., "Complex Nature of Ionic Coordination in Magnesium Ionic Liquid-Based Electrolytes: Solvates with Mobile Mg2+ Cations", Journal of Physical Chemistry C, Apr. 2014, 118(19), pp. 9966-9973.
Giffin, G. et al., "Crystalline Complexes of Pyr12O1TFSI-Based Ionic Liquid Electrolytes", Journal of Physical Chemistry C, Feb. 2015, 119(11), pp. 5878-5887.
Gregory, T. et al., "Nonaqueous Electrochemistry of Magnesium: Applications to Energy Storage", Journal of the Electrochemical Society, Mar. 1990, 137(3), pp. 775-780.
Groger, O. et al., "Review—Electromobility: Batteries or Fuel Cells?", Journal of the Electrochemical Society, Oct. 2015, 162(14), pp. A2016-A2622.
Guo, Y. et al., "Boron-based electrolyte solutions with wide electrochemical windows for rechargeable magnesium batteries", Energy & Environmental Science, Aug. 2012, 5(10), pp. 9100-9106.
Ha, S. et al., "Magnesium(II) Bis(trifluoromethane sulfonyl) Imide-Based Electrolytes with Wide Electrochemical Windows for Rechargeable Magnesium Batteries", ACS Applied Materials & Interfaces, Feb. 2014, 6(6), pp. 4063-4073.
Handy, S., "Room temperature ionic liquids: different classes and physical properties", Current Organic Chemistry, 2005, 9(10), pp. 959-989.
Hardwick, L. et al., "Raman study of lithium coordination in EMI-TFSI additive systems as lithium-ion battery ionic liquid electrolytes", Journal of Raman Spectroscopy, Jan. 2007 (first published Oct. 2006), 38(1), pp. 110-112.
Hayamizu, K. et al., "1H, 7Li, and 19F nuclear magnetic resonance and ionic conductivity studies for liquid electrolytes composed of glymes and polyetheneglycol dimethyl ethers of CH3O(CH2CH2O)nCH3 (n=3-50) doped with LiN(SO2CF3)2", Sep. 2002, 117(12), pp. 5929-5939.
Henderson, W. et al., "Glyme-Lithium Bis(trifluoromethanesulfonyl)imide and Glyme-Lithium Bis

(56) References Cited

OTHER PUBLICATIONS (perfluoroethanesulfonyl)imide Phase Behavior and Solvate Structures", Chemistry of Materials, Apr. 2005, 17(9), pp. 2284-2289.
Henderson, W. et al., "Glyme-Lithium Salt Phase Behavior", Journal of Physical Chemisry, Jun. 2006, 110(26), pp. 13177-13183.
Henderson, W., et al., "Phase Behavior of Ionic Liquid-LiX Mixtures: Pyrrolidinium Cations and TFSI-Anions", Chemistry of Materials, Jul. 2004, 16(15), pp. 2881-2885.
Henderson, W., et al., "Triglyme-Li+ Cation Solvate Structures: Models for Amorphous Concentrated Liquid and Polymer Electrolytes (I)", Chemistry of Materials, Nov. 2003, 15(24), pp. 4679-4684.
Herstedt, M. et al., "Spectroscopic characterization of the conformational states of the bis(trifluoromethanesulfonyl) imide anion (TFSI-)", Journal of Raman Spectroscopy, Aug. 2005 (published online Apr. 2005), 36(8), pp. 762-770.
Howlett, P. et al., "Electrochemistry at Negative Potentials in Bis(trifluoromethanesulfonyl)amide Ionic Liquids", Zeitschrift für Physikalische Chemie, 2006, 220(10-11), pp. 1483-1498.
Huang, X. et al., "The Reduction of Oxygen in Various Room Temperature Ionic Liquids in the Temperature Range 293-318 K: Exploring the Applicability of the Stokes-Einstein Relationship in Room Temperature Ionic Liquids", Journal of Physical Chemistry B, Jun. 2009, 113(26), pp. 8953-8959.
Huie, M. et al., "Cathode materials for magnesium and magnesium-ion based batteries", Coordination Chemistry Reviews, Mar. 2015 (available online Dec. 2014), 287, pp. 15-27.
Islam, M et al., "Roles of Ion Pairing on Electroreduction of Dioxygen in Imidazolium-Cation-Based Room-Temperature Ionic Liquid", Journal of Physical Chemistry C, Jan. 2008, 112(4), pp. 1269-1275.
Izatt, R. et al., "Thermodynamic and kinetic data for cation-macrocycle interaction", Chemical Reviews, 1985, 85(4), pp. 271-339.
Johansson, A. et al., "The imide ion: potential energy surface and geometries", Electrochimica Acta, Apr. 1998, 43 (10-11), pp. 1375-1379.
Kakibe, T. et al., "Binary ionic liquid electrolytes containing organomagnesium complex for rechargeable magnesium batteries", Journal of Power Sources, Apr. 2012 (available online Nov. 2011), 203, pp. 195-200.
Kar, M. et al., "Chelating ionic liquids for reversible zinc electrochemistry", Physical Chemistry Chemical Physics, Mar. 2013, 15, 7191-7197.
Kim, I. et al., "Effects of alkoxide addition on the electrochemical deposition and dissolution in triglyme-based solution dissolving magnesium bis(trifluoromethanesulfonyl)amide", Journal of Power Sources, Mar. 2015 (available online Dec. 2014), 278, pp. 340-343.
Kisza, A. et al., "Kinetics and mechanism of the magnesium electrode reaction in molten magnesium chloride", Journal of Applied Electrochemistry, Oct. 1995, 25(10), pp. 940-946.
Kisza, A. et al., "Kinetics and Mechanism of the Magnesium Electrode Reaction in Molten MgCl2—NaCl Binary Mixtures", Journal of the Electrochemical Society, May 1997, 144(5), pp. 1646-1651.
Kitada, A. et al., "Room Temperature Magnesium Electrodeposition from Glyme-Coordinated Ammonium Amide Electrolytes", Journal of the Electrochemical Society, Jun. 2015, 162(8), pp. D389-D396, presented at the Cancun, Mexico, Meeting of the Society, Oct. 5-9, 2014.
Kitada, A. et al., "Room-Temperature Electrodeposition of Mg Metal from Amide Salts Dissolved in Glyme-Ionic Liquid Mixture", Journal of the Electrochemical Society, 2014 (published Dec. 2013), 161(3), pp. D102-D106, (This was Paper 73 presented at the San Francisco, California, Meeting of the Society, Oct. 27-Nov. 1, 2013).
Kuboki, T. et al., "Lithium-air batteries using hydrophobic room temperature ionic liquid electrolyte", Journal of Power Sources, Aug. 2005 (available online May 2005), 146(1-2), pp. 766-769.

Lassegues, J. et al., "Lithium solvation in bis(trifluoromethanesulfonyl)imide-based ionic liquids", Physical Chemistry Chemical Physics, Nov. 2006, 8, pp. 5629-5632.
Lassegues, J. et al., "Spectroscopic Identification of the Lithium Ion Transporting Species in LiTFSI-Doped Ionic Liquids", Journal of Physical Chemistry A, 2009 (published on web Dec. 2008), 113(1), pp. 305-314.
Lee, J. et al., "Toward understanding the origin of positive effects of ionic liquids on catalysis: formation of more reactive catalysts and stabilization of reactive intermediates and transition states in ionic liquids.", Accounts of Chemical Research, Mar. 2010, 43(7), pp. 985-994.
Lewandowski, A. et al., "Ionic liquids as electrolytes for Li-ion batteries—An overview of electrochemical studies", Journal of Power Sources, Dec. 2009 (available online Jul. 2009), 194(2), pp. 601-609.
Liebenow, C. et al., "The electrodeposition of magnesium using solutions of organomagnesium halides, amidomagnesium halides and magnesium organoborates", Electrochemistry Communications, Sep. 2000 (available online Aug. 2000), 2(9), pp. 641-645.
Linn, C. et al., "The Catalyzed Reaction of Ethylmagnesium Bromide with Ethyl Bromide", Journal of the American Chemical Society, 1936, 58(5), pp. 816-819.
Liu, T. et al., "A fundamental study on the [(μ-Cl)3Mg2(THF)6]+ dimer electrolytes for rechargeable Mg batteries", Chemical Communications, Jan. 2015, 51(12), pp. 2312-2315.
Lodovico et al., "Electrochemical Behavior of Iron and Magnesium in Ionic Liquids", Journal of the Brazilian Chemical Society, 2014 (published online Dec. 2013), 25(3), pp. 460-468.
Lossius, L. et al., "Plating of magnesium from organic solvents", Electrochimica Acta, Feb. 1996, 41(3), pp. 445-447.
Lu, Z. et al., "On the electrochemical behavior of magnesium electrodes in polar aprotic electrolyte solutions", Journal of Electroanalytical Chemistry, May 1999, 466 (2), pp. 203-217.
Lv, D. et al., "A Scientific Study of Current Collectors for Mg Batteries in Mg(AlCl2EtBu)2/THF Electrolyte", The Journal of the Electrochemical Society, 2013 (published Dec. 2012), 160(2), pp. A351-A355.
MacFarlane, D. et al., "Energy applications of ionic liquids", Energy & Environmental Science, Jan. 2014 (first published Aug. 2013), 7(1), 232-250.
Mandai, T. et al., "Criteria for solvate ionic liquids", Mar. 2014, Physical Chemistry Chemical Physics, 16(19), pp. 3761-8772.
Mandai, T. et al., "Effect of Ionic Size on Solvate Stability of Glyme-Based Solvate Ionic Liquids", Journal of Physical Chemistry B, 2015 (published on web Dec. 2014), 119(4), pp. 1523-1534.
Marks, T. et al., "Actinide organometallic chemistry", Accounts of Chemical Research, 1977, 77(2), pp. 263-293.
Marks, T. et al., "Structure and dynamics in metal tetrahydroborates. II. Vibrational spectra and structures of some transition metal and actinide tetrahydroborates", Inorganic Chemistry, 1972, 11(10), pp. 2540-2546.
Maroni, V. et al., "Structural studies of magnesium halide-potassium halide melts by Raman spectroscopy", Journal of Physical Chemistry, 1971, 75(1), pp. 155-159.
Martinez, A. et al., "Electrodeposition of magnesium from the eutectic LiCl-KCl melt", Journal of Applied Electrochemistry, Dec. 2004, 34(12), pp. 1271-1278.
Matsumoto, K. et al., "Coordination environment around the lithium cation in solid Li2(EMIm)(N(SO2CF3)2)3 (EMIm= 1-ethyl-3-methylimidazolium): Structural clue of ionic liquid electrolytes for lithium batteries", Solid State Sciences, Sep. 2006 (available online Jun. 2006), 8(9), pp. 1103-1107.
Mizushima, K. et al., "LixCoO2 (0<x<-1): A new cathode material for batteries of high energy density", Materials Research Bulletin, Jun. 1980, 15(6), pp. 783-789.
Mohtadi, R. et al., "Magnesium batteries: Current state of the art, issues and future perspectives", Beilstein Journal of Nanotechnology, Aug. 2014, 5, pp. 1291-1311.
Mohtadi, R. et al., "Magnesium Borohydride: From Hydrogen Storage to Magnesium Battery", Angewandte Communications, Aug. 2012, 51(39), pp. 9780-9783.

(56) References Cited

OTHER PUBLICATIONS

Monteiro M. et al. "Transport Coefficients, Raman Spectroscopy, and Computer Simulation of Lithium Salt Solutions in an Ionic Liquid", Journal of Physical Chemistry B, Jan. 2008, 112(7), pp. 2102-2109.
Moore, G., "Cramming more components onto integrated circuits", Proceedings of the IEEE, Jan. 1998, 86(1), pp. 82-85 (Reprinted from Gordon E. Moore, "Cramming More Components onto Integrated Circuits," Electronics, pp. 114-117, Apr. 19, 1965).
Muldoon, J. et al., "Corrosion of magnesium electrolytes: chlorides—the culprit", Energy & Environmental Science, 2013 (first published Dec. 2012), 6(2), pp. 482-487.
Muldoon, J. et al., "Electrolyte roadblocks to a magnesium rechargeable battery", Energy & Environmental Science, Jan. 2012, 5, pp. 5941-5950.
Muldoon, J. et al., "Quest for Nonaqueous Multivalent Secondary Batteries: Magnesium and Beyond", Chemical Reviews, Oct. 2014, 114(23), pp. 11683-11720.
Murase, K. et al., "Enhanced Anodic Dissolution of Magnesium in Quaternary-Ammonium-Based Ionic Liquid containing a Small Amount of Water", Journal of the Electrochemical Society, Aug. 2013, 160(10), pp. D453-D458 (Paper 383 presented at the Las Vegas, Nevada, Meeting of the Society, Oct. 10-15, 2010).
Nicotera, I. et al., "NMR Investigation of Ionic Liquid—LiX Mixtures: Pyrrolidinium Cations and TFSI—Anions", Journal of Physical Chemistry B, Nov. 2005, 109(48), pp. 22814-22819.
Noda, A. et al., "Brønsted Acid-Base Ionic Liquids as Proton-Conducting Nonaqueous Electrolytes", Journal of Physical Chemistry B, Apr. 2003, 107(17), pp. 4024-4033.
Nowinski, J. et al., "Structure of LiN(CF3SO2)2, a novel salt for electrochemistry", Journal of Materials Chemistry, 1994, 4(10), pp. 1579-1580.
Nuli, Y. et al., "Electrochemical Magnesium Deposition and Dissolution with High Efficiency in Ionic Liquid", Electrochemical and Solid-State Letters, 2005, 8(11), pp. C166-C169.
Nuli, Y. et al., "Electrodeposition of magnesium film from BMIMBF4 ionic liquid", Applied Surface Science, Sep. 2006 (available online Nov. 2005), 252(23), pp. 8086-8090.
O'Laoire, C. et al., "Elucidating the Mechanism of Oxygen Reduction for Lithium-Air Battery Applications", Journal of Physical Chemistry C, Oct. 2009, 113(46), pp. 20127-20134.
O'Laoire, C., "Investigations of oxygen reduction reactions in non-aqueous electrolytes and the lithium-air battery", Northeastern University Digital Repository Service, Dissertation, 2010, 172 pages, <https://repository.library.northeasten.edu/files/neu:692/fulltext.pdf>, retrieved Nov. 26, 2018.
Overcash, O. et al., "The Electrodeposition of Magnesium", Journal of Electrochemical Society, 1933, 64, 305-311.
Pappenfus, T. et al., "Complexes of Lithium Imide Salts with Tetraglyme and Their Polyelectrolyte Composite Materials", Journal of Electrochemical Society, Jan. 2004, 151(2), pp. A209-A215.
Park, M. et al., "Recent Advances in Rechargeable Magnesium Battery Technology: A Review of the Field's Current Status and Prospects", Israel Journal of Chemistry, Mar. 2015, 55(5), pp. 570-585.
Patent Cooperation Treaty, International Searching Authority, International Preliminary Report on Patentability for PCT/US2010/034235, 27 pages, report completed Nov. 14, 2011.
Patent Cooperation Treaty, International Searching Authority, International Preliminary Report on Patentability for PCT/US2011/036151, 13 pages, report completed Aug. 27, 2012.
Patent Cooperation Treaty, International Searching Authority, International Search Report for PCT/US2010/034235, 3 pages.
Patent Cooperation Treaty, International Searching Authority, International Search Report for PCT/US2011/036151, 4 pages, dated Aug. 10, 2011.
Patent Cooperation Treaty, International Searching Authority, Written Opinion for PCT/US2010/034235, 8 pages.
Patent Cooperation Treaty, International Searching Authority, Written Opinion for PCT/US2011/036151, 10 pages.
Peled, E. et al., "The Kinetics of the Magnesium Electrode in Thionyl Chloride Solutions", Journal of Electrochemical Society, Jul. 1977, 124(7), pp. 1030-1035.
Petersen, U., "Mining the hydrosphere", Geochimica et Cosmochimica Acta, May 1994, 58(10), pp. 2387-2403.
Qian, J. et al., "High rate and stable cycling of lithium metal anode", Nature Communications, Feb. 2015, 6, article No. 6362, 9 pages.
Rajput, N. et al., "The Coupling between Stability and Ion Pair Formation in Magnesium Electrolytes from First-Principles Quantum Mechanics and Classical Molecular Dynamics", Journal of American Chemical Society, Feb. 2015, 137(9), pp. 3411-3420.
Rebelo, L. et al., "On the Critical Temperature, Normal Boiling Point, and Vapor Pressure of Ionic Liquids", Journal of Physical Chemistry B, Mar. 2005, 109(13), pp. 6040-6043.
Rene, A. et al., "Superoxide Protonation by Weak Acids in Imidazolium Based Ionic Liquids", Journal of Physical Chemistry B, Feb. 2009, 113(9), pp. 2826-2831.
Rey, I. et al., "Spectroscopic and Theoretical Study of (CF3SO2)2N- (TFSI-) and (CF3SO2)2NH (HTFSI)", Journal of Physical Chemistry, Apr. 1998, 102(19), pp. 3249-3258.
Rollins, C. et al., "Kinetics and Thermodynamics of Hydrogen Oxidation and Oxygen Reduction in Hydrophobic Room-Temperature Ionic Liquids", Journal of the Electrochemical Society, Jun. 2009, 156(8), pp. B943-B954.
Rudolph, W. et al., "Raman spectroscopic investigation of speciation in MgSO4(aq)", Physical Chemistry Chemical Physics, Oct. 2003, 5, pp. 5253-5261.
Saito, Y. et al., "Existing condition and migration property of ions in lithium electrolytes with ionic liquid solvent", Journal of Physical Chemistry B, Sep. 2007, 111(40), pp. 11794-11802.
Sasaki, I. et al., "Anodic Dissolution Behavior of Magnesium in Hydrophobic Ionic Liquids", ECS Transactions, 2011, 33(27), pp. 65-70.
Seo, D. et al., "Electrolyte Solvation and Ionic Association II. Acetonitrile-Lithium Salt Mixtures: Highly Dissociated Salts", Journal of the Electrochemical Society, Aug. 2012, 159(9), pp. A1489-A1500.
Seo, D. et al., "Solvate Structures and Spectroscopic Characterization of LiTFSI Electrolytes", Journal of Physical Chemistry B, Oct. 2014, 118(47), pp. 13601-13608.
Serizawa, N. et al., "EQCM Measurement of Deposition and Dissolution of Lithium in Glyme-Li Salt Molten Complex", Journal of the Electrochemical Society, Jul. 2013, 160(9), pp. A1529-1533.
Shao, M. et al., "Superoxide Anion is the Intermediate in the Oxygen Reduction Reaction on Platinum Electrodes", Journal of the American Chemical Society, May 2006, 128(23), pp. 7408-7409.
Shao, Y. et al., "Coordination Chemistry in magnesium battery electrolytes: how ligands affect their performance", Scientific Reports, Nov. 2013, 3, article 3130, 7 pages.
Shao, Y. et al., "Nanocomposite polymer electrolyte for rechargeable magnesium batteries", Nano Energy, Mar. 2015 (available online Dec. 2014), 12, pp. 750-759.
Shimamura, O. et al., "Electrochemical co-deposition of magnesium with lithium from quaternary ammonium-based ionic liquid", Journal of Power Sources, Feb. 2011 (available online Aug. 2010), 196(3), pp. 1586-1588.
Shin, J, et al., "An Elegant Fix for Polymer Electrolytes", Electrochemical and Solid-State Letters, Jan. 2005, 8(2), pp. A25-A127.
Shirai, A. et al., "Solvation of lithium ion in N,N-diethyl-N-methyl-N-(2-methoxyethyl)ammonium bis trifluoromethanesulfonyl)-amide using Raman and multinuclear NMR spectroscopy", Analytical Sciences, Oct. 2008, 24(10), pp. 1291-1296.
Shirk, A. et al., "Raman and infrared spectra of tetrahydroaluminate, AlH4-, and tetrahydrogallate, GaH4-, salts", Journal of the American Chemical Society, 1973, 95(18), pp. 5904-5912.
Shterenberg, I. et al., "Evaluation of (CF3SO2)2N-(TFSI) Based Electrolyte Solutions for Mg Batteries", Journal of the Electrochemical Society, Sep. 2015, 162(13), pp. A7118-A7128.
Shterenberg, I. et al., "The challenge of developing rechargeable magnesium batteries", MRS Bulletin, May 2014, 39(5), pp. 453-460.
Stark, A. et al., "Ionic Liquids", Jan. 2007, Kirk-Othmer Encyclopedia of Chemical Technology, 26, pp. 836-920.

Intensity

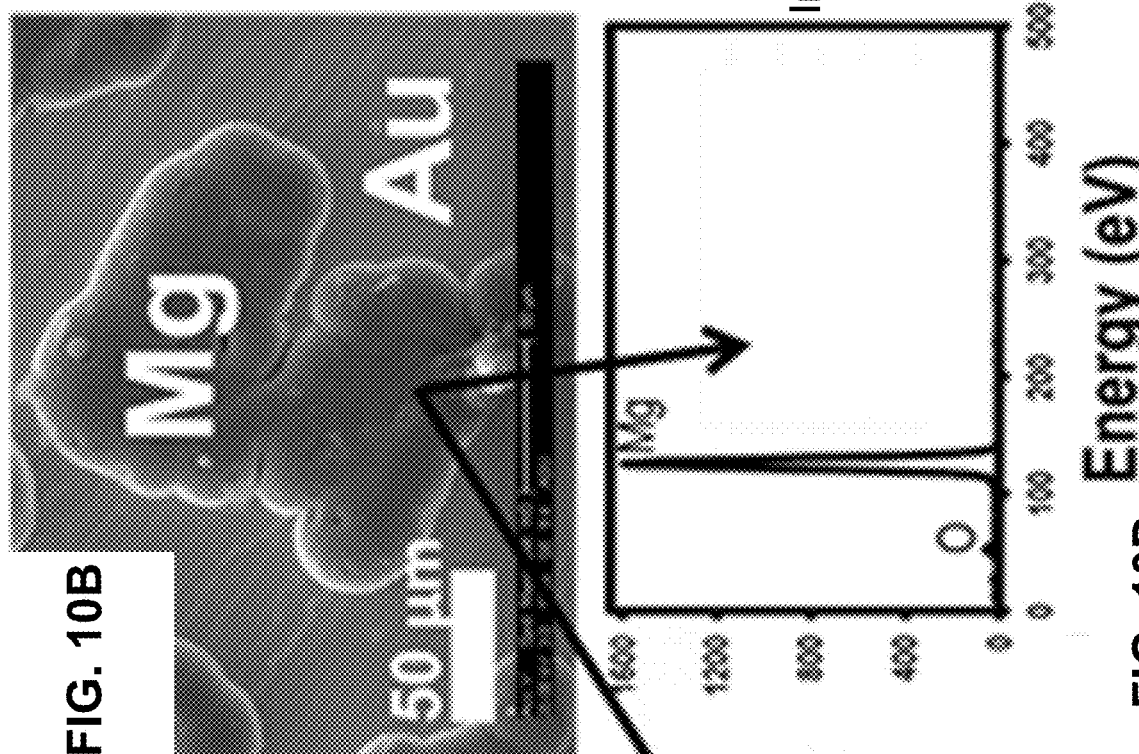
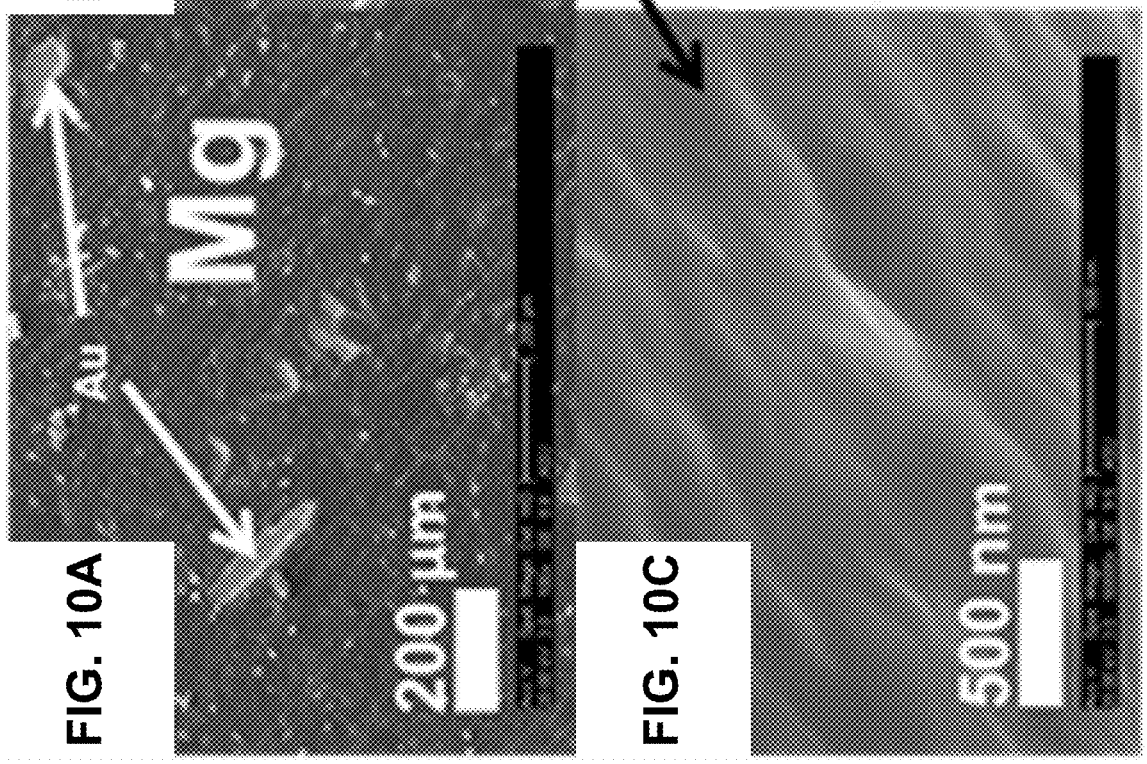

US 10,700,382 B2

CHELATING IONIC LIQUIDS FOR MAGNESIUM BATTERY ELECTROLYTES AND SYSTEMS

CROSS-REFERENCE TO RELATED APPLICATIONS

This application is a continuation of U.S. patent application Ser. No. 15/942,741 filed on Apr. 2, 2018, now published as U.S. Patent Application Publication No. 2018-0233781 entitled "CHELATING IONIC LIQUIDS FOR MAGNESIUM BATTERY ELECTROLYTES AND SYSTEMS". U.S. Ser. No. 15/942,741 is a continuation of PCT Patent Application No. PCT/US2016/059712 filed on Oct. 31, 2016, now published as WO 2017/066810 entitled "CHELATING IONIC LIQUIDS FOR MAGNESIUM BATTERY ELECTROLYTES AND SYSTEMS." PCT/US2016/059712 claims priority to, and the benefit of, U.S. Provisional Patent Application No. 62/240,678 filed on Oct. 13, 2015 entitled "CHELATING IONIC LIQUID FAMILY FOR MAGNESIUM BATTERY". PCT/US2016/059712 also claims priority to, and the benefit of, U.S. Provisional Patent Application No. 62/297,261 filed on Feb. 19, 2016 entitled "CHELATING IONIC LIQUIDS FOR MAGNESIUM BATTERY ELECTROLYTES AND SYSTEMS". The contents of all of the foregoing applications are hereby incorporated by reference for all purposes.

FEDERALLY SPONSORED RESEARCH OR DEVELOPMENT

This invention was made with Government support under Contract No. W911NF-11-1-0432 awarded by the United States Army Research Office. The U.S. Government has certain rights in the invention.

TECHNICAL FIELD

The present disclosure relates to ionic liquids for rechargeable magnesium batteries, and in particular, to rechargeable magnesium battery electrolytes and ionic liquids containing ether chelating functional groups.

BACKGROUND

The realization of reliable battery chemistries beyond the present Li-ion systems is an important goal in the field of energy conversion and storage. The theoretical metrics of a rechargeable battery using a metallic magnesium (Mg) anode (3832 mAh/cm3 volumetric and 2205 mAh/g gravimetric capacities) have motivated significant efforts to develop electrolytes and cathode materials for secondary Mg batteries. The fundamental requirement for an electrolyte to be compatible with the electro-chemistries of both the cathode and anode is not trivially met in Mg-based systems. For instance, simple Mg electrolytes analogous to those of typical Li battery chemistries have yet to show reversible electrodeposition of Mg metal. To date, most reported Mg electrolytes have been derived from organometallic sources, predominantly Grignard reagents or analogues, often in concert with AlRxCl3-x (R=alkane or aryl group) to provide increased oxidative stability. In some recent systems, the [(μ-Cl)3Mg2(THF)6]+ dimer and/or the [MgCl(THF)5+] monomer have been implicated in producing reversible electrochemical deposition and dissolution. These various systems have shown reversible electrodeposition of dendrite-free Mg with high coulombic efficiencies and reasonable oxidative stabilities. However, halide electrolytes can be corrosive toward typical current collecting metals, limiting their commercial applicability. Many Mg electrolytes also have unattractive safety characteristics due to use of Grignards and/or tetrahydrofuran (THF) in the electrolyte. Accordingly, improved Mg battery electrolytes and electrochemical systems utilizing the same remain desirable.

SUMMARY

In various embodiments, the present disclosure includes a rechargeable magnesium battery configured with an ionic liquid medium, the battery comprising an anode electrode, a cathode electrode, and the ionic liquid medium in contact with the anode electrode and the cathode electrode. In various embodiments, the ionic liquid medium comprises at least one cation, at least one anion, and at least one magnesium (Mg) salt represented by the formula MgX2, wherein X comprises at least one of Cl—, Br—, I—, TFSI—, FSI—, ClO4-, BF4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb- (wherein the sum of subscripts a and b is 4, X consists of a halide, and R consists of at least one of an alkyl or aryl group), carboranes, or hexamethyldisilazide.

In various embodiments, the chelating ionic liquid further comprises a polyether chain. In various embodiments, a concentration of oxygen atoms in the polyether chain comprises a molar ratio of between 3 and 6 per Mg2+ atom in the chelating ionic liquid. In various embodiments, the polyether chain comprises diglyme. In various embodiments, the polyether chain comprises a pendant chain coupled to the cation. In various embodiments, the cation comprises N-methoxyPEGm-N-methylpyrrolidinium cations, wherein PEG comprises a polyethylene glycol chain, and m comprises the number of ether oxygen's in the PEG chain. In various embodiments, the anion comprises at least one of bis(trifluoromethylsulfonyl)imide (TFSI), bis(fluorosulfonyl)imide (FSI—), IIIX4- (III=B, Al, Ga, In, X=H, F, Cl, Br, I), AF6-(A=P, As, Sb), imidazole-based anions, sulfonate-based anions, carboxylate-based anions, borate-based anions, carborane-based anions, or cyanamide-based anions. In various embodiments, a concentration of BH4- is at least as high as a concentration of water in the chelating ionic liquid.

In various embodiments, the present disclosure provides an electrolyte comprising at least one cation, at least one anion, and at least one, soluble, magnesium salt selected from the group consisting of MgX2, wherein X comprises at least one of Cl—, Br—, I—, TFSI—, FSI—, ClO4-, BF4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb- (wherein the sum of subscripts a and b is 4, X consists of a halide, and R consists of at least one of an alkyl or aryl group), carboranes, or hexamethyldisilazide.

In various embodiments, the electrolyte further comprises a polyether chain. In various embodiments, a concentration of oxygen atoms in the polyether chain comprises a molar ratio of between 3 and 6 per Mg2+ atom in the chelating ionic liquid. In various embodiments, the polyether chain comprises diglyme. In various embodiments, the polyether chain comprises a pendant chain coupled to the cation. In various embodiments, the cation comprises N-methoxyPEGm-N-methylpyrrolidinium cations, wherein PEG comprises a polyethylene glycol chain, and m comprises the number of ether oxygen's in the PEG chain. In various embodiments, the anion comprises at least one of bis(trifluoromethylsulfonyl)imide (TFSI), bis(fluorosulfonyl)imide (FSI—), IIIX4- (III=B, Al, Ga, In; X=H, F, Cl, Br, I), AF6- (A=P, As, Sb), imidazole-based anions, sulfonate-based anions, carboxylate-based anions, borate-based anions, carborane-based anions, or cyanamide-based anions. In various embodiments, a concentration of BH4- is at least as high as a concentration of water in the chelating ionic liquid.

In various embodiments, the present disclosure provides an electrolyte comprising at least one chelating ionic liquid. In various embodiments, the chelating ionic liquid comprises N-methoxyPEGm-N-methylpyrrolidinium cations, wherein PEG comprises a polyethylene glycol chain, and m comprises the number of ether oxygen's in the PEG chain, at least one of bis(trifluoromethylsulfonyl)imide (TFSI), bis(fluorosulfonyl)imide (FSI—), IIIX4- (III=B, Al, Ga, In; X=H, F, Cl, Br, I), AF6- (A=P, As, Sb), imidazole-based anions, sulfonate-based anions, carboxylate-based anions, borate-based anions, carborane-based anions, or cyanamide-based anions, and at least one magnesium salt selected from the group consisting of MgX2, wherein X comprises at least one of Cl—, Br—, I—, TFSI—, FSI—, ClO4-, BF4-, BH4-, PF6-, RSO3- (wherein R consists of at least one of an alkyl or aryl group), RCO2- (wherein R consists of at least one of an alkyl or aryl group), alkyl borides, alkyl borates, AlCl4-, AlXaRb— (wherein the sum of subscripts a and b is 4, X consists of a halide, and R consists of at least one of an alkyl or aryl group), or hexamethyldisilazide. In various embodiments, the at least one magnesium salt is dissolved in the chelating ionic liquid.

BRIEF DESCRIPTION OF THE DRAWINGS

With reference to the following description and accompanying drawings:

FIGS. 10A, 10B, and 10C illustrate three scanning electron micrograph (SEM) images of a sample portion, and FIG. 10D illustrates an energy-dispersive x-ray spectroscopy (EDS) spectrum for a sample portion, in accordance with various embodiments;

DETAILED DESCRIPTION

Figure 1A:
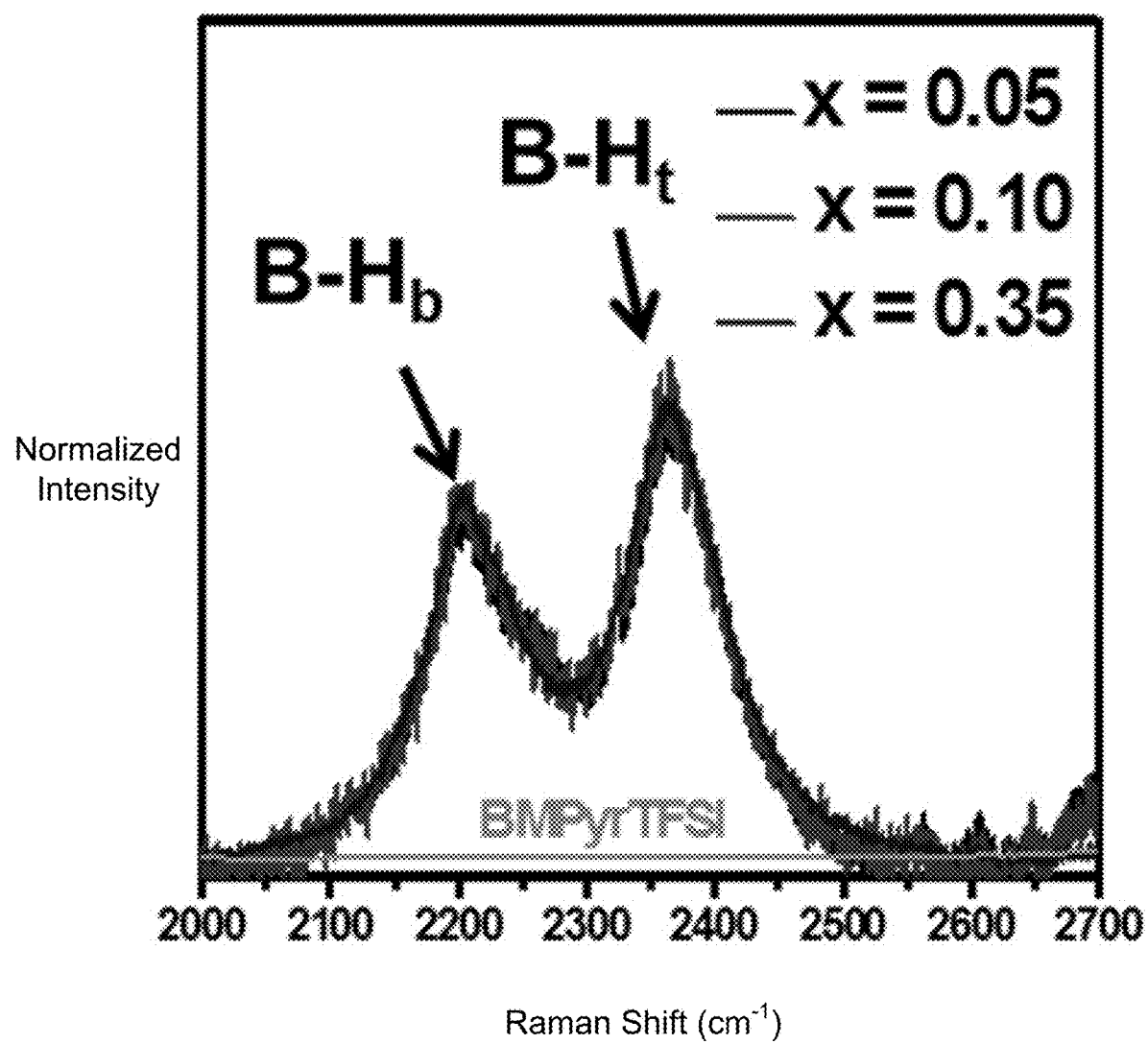
FIG. 1A illustrates Raman spectra for BMPyrTFSI, each spectrum normalized using the 2200 cm-1 peak, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for electrochemistry including reversible electrodeposition, dissolution, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or method for the use of chelating ionic liquid to facilitate reversible electrodeposition and dissolution of magnesium metal from electrodes.

The present disclosure may be applied to any composition, system, or method for the use of a chelating ionic liquid to facilitate reversible electrodeposition and dissolution of magnesium metal from electrodes. The present disclosure may be applied to a solution for use in an electrochemical cell, and/or an electrochemical cell which may be used as a battery. In various embodiments, the present disclosure may include electrochemical cell materials and methods of preparing electrochemical cells.

Chelating ionic liquids may be used for chelating a magnesium salt or ion. Chelating ionic liquid(s) may be liquid, gels, or solids at room temperature, but will generally form a liquid below 100° C. Chelating ionic liquids may be thermally stable with little to no measurable vapor pressure below 100° C., and often to temperatures well above 100° C.

In various embodiments, chelating ionic liquids may comprise a neutral polyether chain. The neutral polyether chain may comprise a short chain polyether solvent such as polyethylene glycol. In various embodiments, the neutral polyether chain may comprise diglyme. A general molecular structure of diglyme may comprise:

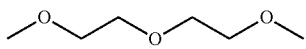

In various embodiments, a desired concentration of neutral polyether chain in the chelating ionic liquid may be determined by the ratio of oxygen atoms in the polyether chains per Mg2+ in the medium. In various embodiments, three oxygens may inhibit the electrolyte medium from reacting with the Mg+ intermediate. Thus, in various embodiments, the polyether concentration may provide a molar ratio of between three and six oxygens per Mg2+ in the chelating ionic liquid. In various embodiments, the polyether concentration may provide a molar ratio of more than six oxygens per Mg2+ in the chelating ionic liquid. However, the neutral polyether chain may comprise any suitable concentration.

In various embodiments, the neutral polyether chain may comprise PEGm, where PEG=polyethylene glycol chain, and m=the number of ether oxygen's in the PEG chain. In various embodiments, the neutral polyether chain may comprise a polythioether, where oxygen in the polyether is substituted by either sulfur (S). In various embodiments, the oxygen in the polyether may be substituted with nitrogen coupled to a pendant group (NR). In various embodiments, the oxygen in the polyether may be substituted with phosphorous coupled to a pendant group (PR).

In various embodiments, chelating ionic liquids may comprise one or more functional groups attached to an ionic liquid cation. In various embodiments of the present disclosure, the cation of the chelating ionic liquid comprises one or more pendant chains. In various embodiments, a desired concentration of the cation in the chelating ionic liquid may be determined by the ratio of oxygen atoms in the pendant chain per Mg2+ in the medium. In various embodiments, the cation concentration may provide a molar ratio of between three and six pendant chain oxygens per Mg2+ in the chelating ionic liquid. In various embodiments, the cation concentration may provide a molar ratio of more than six pendant chain oxygens per Mg2+ in the chelating ionic liquid. However, the cation may comprise any suitable concentration.

In various embodiments, the pendant chain may comprise a polyether chain. Stated differently, in some embodiments of the present disclosure, a polyether chain may be attached to the ionic liquid cation, and in other embodiments, a neutral polyether chain may not be attached to the ionic liquid cation. In various embodiments, the pendant chain may comprise a polyalkylamine. The fact that the chain is pendent from the cation of the chelating ionic liquid may reduce volatility or prevent the complexing agent from being volatile, as it would be if, for example, a neutral polyether chain were simply added.

In various embodiments, the neutral polyether chain and/or the pendant chain may prevent or disrupt direct interactions of the Mg2+ species with the anions in the chelating ionic liquid. Interactions between the Mg2+ species with the anions in the chelating ionic liquid may impede decomplexation of Mg2+ from the anions, which is desirable for facile reduction to make Mg metal or insertion/incorporation of Mg2+ into/with the cathode material. These interactions may also cause unwanted reactions between various magnesium species and the anions. Accordingly, in various embodiments, the neutral polyether chain and/or the pendant chain may facilitate facile reduction to make Mg metal or insertion/incorporation of Mg2+ into/with the cathode material.

In various embodiments, the chelating ionic liquid may comprise cations and anions. The cations may comprise N-methoxyPEGm-N-methylpyrrolidinium, where PEG=polyethylene glycol chain, and m=the number of ether oxygen's in the PEG chain. The anions may comprise bis(trifluoromethylsulfonyl)imide (TFSI). However, present disclosure is not limited to pyrrolidinium-based cations and TFSI— anions. In various embodiments, the cations may comprise any suitable cations, including ammonium, pyridinium, imidazolium or phosphonium groups. In various embodiments, the cations may contain more than one pendent chelating chain.

In various embodiments, the anions may comprise any suitable anions, including bis(fluorosulfonyl)imide (FSI—), IIIX4- (III=B, Al, Ga, In, X=H, F, Cl, Br, I), AF6- (A=P, As, Sb), or any imidazole-based, carboxylate-based, sulfonate-based, borate-based, carborane-based, or cyanamide-based anions. In various embodiments, the concentration of anion in the chelating ionic liquid may be determined by the amount of trace water concentration in the chelating ionic liquid. In various embodiments, the concentration of anion may be equal to the trace water concentration. In various embodiments, the concentration of anion may be greater than the trace water concentration. However, the anion may comprise any suitable concentration.

In various embodiments, a general molecular structure for the chelating ionic liquid, also referred to herein as a PEGylated ionic liquid, may comprise:

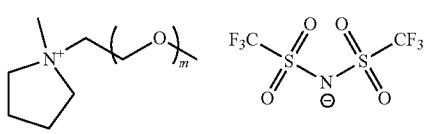

However, the chelating ionic liquid may comprise cations and anions that are not pyrrolidinium-based cations or TFSI— anions.

In various embodiments, ionic liquid cations are synthesized in which methoxy terminated polyethylene glycol (PEG) chains are made pendent on methylpyrrolidinium cations (labeled MPEGmPyr+ where M=methyl, m=number of ether oxygens in the PEG chain and Pyr=pyrrolidinium) in ionic liquids containing bis(trifluoromethylsulfonyl)imide (TFSI—) anions as the counterion. These task specific ionic liquids containing PEGylated cations are shown to chelate Mg2+ and are therefore termed "chelating ionic liquids."

In various embodiments, principles of the present disclosure utilize a cathode. In various embodiments, solutions were compatible with Mg2+ insertion into a Mo6S8 Chevrel cathode. However, the present disclosure is not limited to any particular cathode phase, and the systems and methods disclosed herein may comprise any suitable cathode phase, in addition to Chevrel. In various embodiments, the cathode phase may comprise Prussian Blue. In various embodiments, the cathode phase may comprise other cathode materials, for example, MnO3, V2O5, MoS2, MnO2, sulfur, or other metal oxides and metal silicates such as, MgxMSiO4 where x is variable and M is Co, Mn or Fe. A feature of principles of the present disclosure is that the complexation of the Mg2+ with the pendant chain prevents close association of Mg2+ with anionic species. These close associations are kinetically difficult to break up, leading to difficult and slow insertion/incorporation of Mg2+ into/with cathode materials. The non-limiting representative embodiments disclosed herein benefit from these properties.

In various embodiments, oxidative stability can affect the choice of cathode material and current collector. The potential of oxidation varies with the chosen electrode. For example, in an embodiment utilizing Mg(BH4)2/MPEG7PyrTFSI electrolyte, the electrolyte was found to be most stable toward oxidation on stainless steel 316 followed by glassy carbon. It was least stable on the two noble metal electrodes used (Pt and Au).

In various embodiments, the present disclosure contemplates electrochemical systems, for example a battery, comprising an anode. The anode may comprise a metallic magnesium. The battery may be assembled in any suitable manner known to those in the art. In an embodiment where the battery is assembled uncharged, Mg is present in Mg2+ state and thereafter deposited as Mg metal. In various embodiments, magnesium used as the anode may comprise battery-grade purity. Other anode materials may also be used, including copper, aluminum, various stainless steels and the like, as known to those skilled in the battery arts.

Principles of the present disclosure may be applied to any system or method for the use of a chelating ionic liquid to facilitate reversible electrodeposition and dissolution of magnesium metal from electrodes. In various embodiments, the chelating ionic liquid may dissolve a magnesium salt. In various embodiments, the magnesium salt may comprise Mg(BH4)2. In various embodiments, the magnesium salt may comprise a MgX2 composition, where X comprises at least one of Cl—, Br—, I—, TFSI—, FSI—, ClO4-, BF4-, PF6-, RSO3- (i.e. sulfonates, where R is an alkyl or aryl group), alkyl borides, alkyl borates, AlCl4-, AlXaRb- (where the sum of subscripts a and b is 4, X is a halide, and R is an alkyl or aryl group), carboranes, or hexamethyldisilazide. In various embodiments, the magnesium salt may comprise a borate-based salt, for example, Mg(BR4)2. In various embodiments, the magnesium salt may comprise organometallic complexes such as Rm, (RO)mMgX2-m+AX3-nR'n (A=Al, B; X=F—, Cl—, Br—; R=alkyl or aryl group; 3≥n≥0; 2≥m≥0). In various embodiments, Grignard systems and systems derived from Grignards would also benefit from application of principles of the present disclosure. Grignards are generally formulated as RMgX, (where R is an alkyl or aryl group and X is a halide). In various embodiments, mixtures of Mg salts (i.e. MgX2) and Grignards may be prepared. In various embodiments, magnesium carborane salts may be used.

In various embodiments, the electrolyte may comprise a supporting salt, in addition to those listed above, such as a Li, Na, or Ca salt. The supporting salt may act as a dual metal ion electrolyte.

In various embodiments, chelating ionic liquids bearing pendent polyether chains designed to complex Mg2+ from a Mg(BH4)2 source are disclosed. This complexation may change the speciation of Mg2+ in these media. In various embodiments, polyether complexation may prevent TFSI— coordination at Mg2+. Polyether complexation may generate free BH4- for the Mg(BH4)2/MPEG7PyrTFSI ionic liquid. These PEGylated ionic liquid electrolytes may result in Mg deposition/dissolution with high CE and very high current density.

Figure 1B:
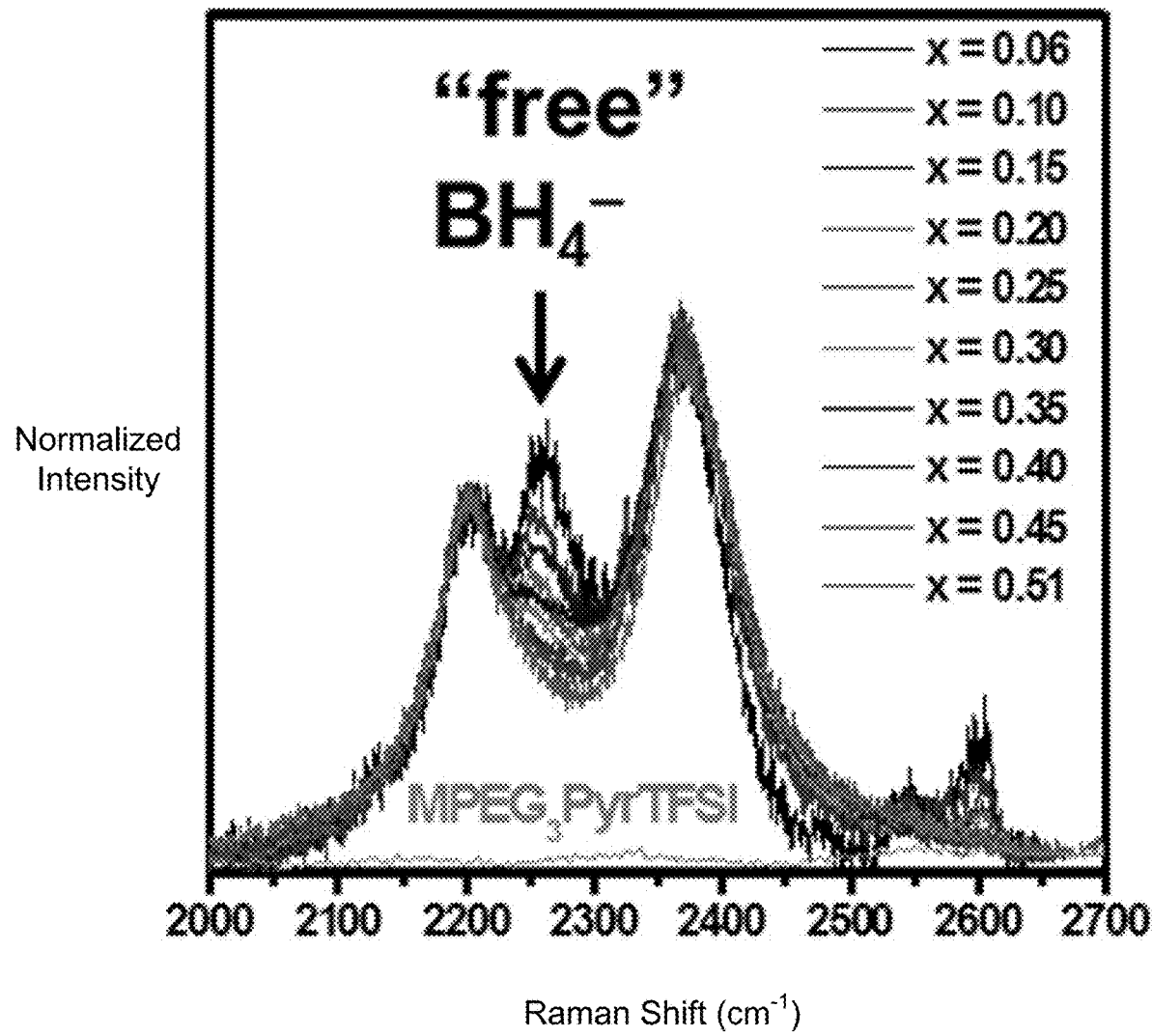
FIG. 1B illustrates Raman spectra for MPEG3PyrTFSI, each spectrum normalized using the 2200 cm-1 peak, in accordance with various embodiments.
Figure 1C:
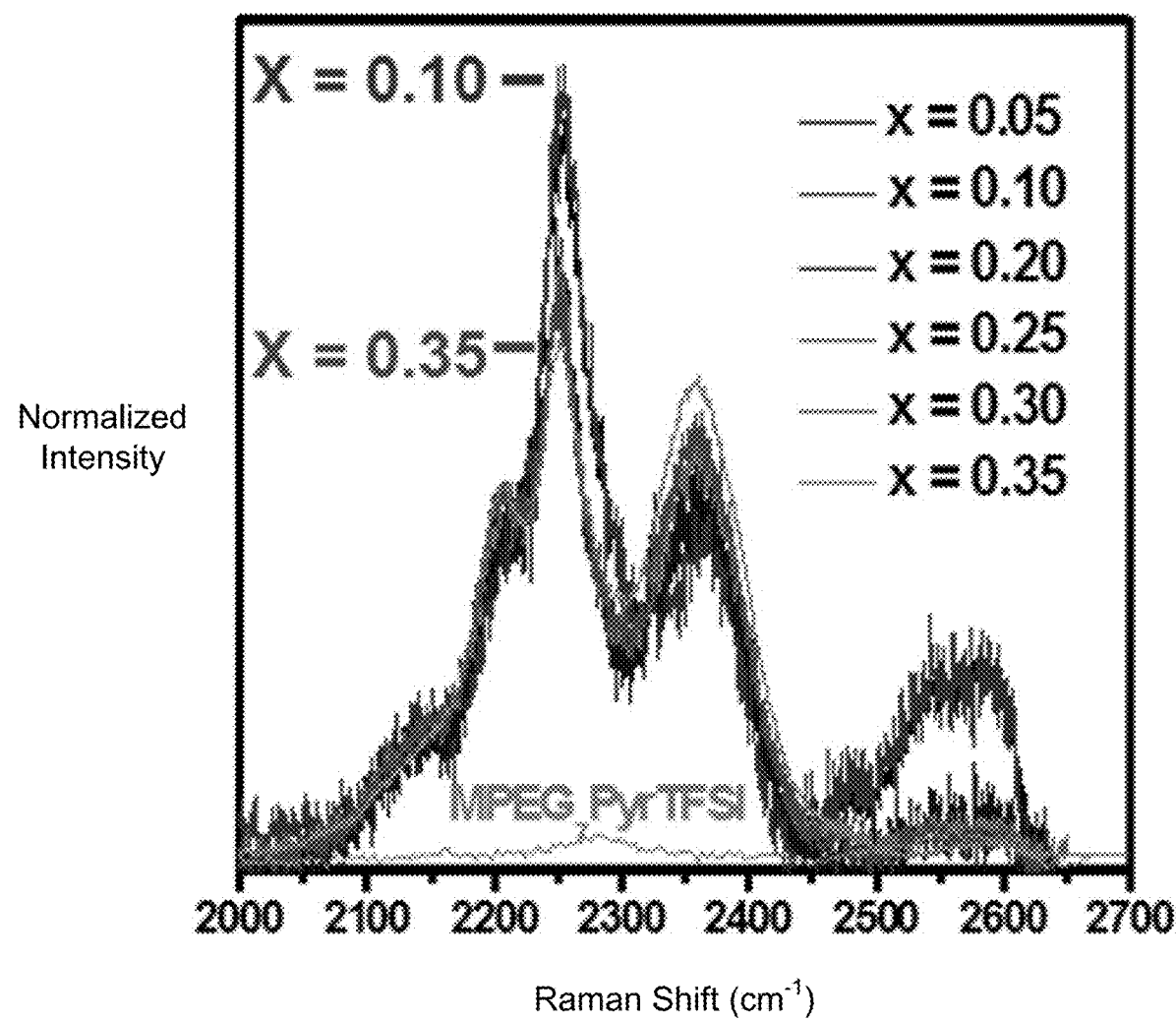
FIG. 1C illustrates Raman spectra for MPEG7PyrTFSI, each spectrum normalized using the 2200 cm-1 peak, in accordance with various embodiments.

In various embodiments containing only TFSI-anions and no ether or polyether solvents, Mg2+ is typically found as Mg(TFSI)3-. If polyether solvents or ionic liquid cations bearing pendent polyether chains are added, for example, such that the molar ratio of total number of ether oxygens to Mg2+ is large (e.g. >5 or 6), the ether oxygens displace TFSI—, producing free TFSI— and Mg2+ bound in a neutral coordination environment of ether oxygens. The number of ether oxygens needed to fully displace all TFSI— anions depends on the length of the polyether chain and its relative concentration. For polyether solvents, TFSI— displacement improves the electrochemical behavior of the Mg2+/Mg redox system considerably. Referring to FIGS. 1A through 1C, the data suggest substantial displacement of at least one of the bound BH4- anions when a sufficient number of polyether oxygens is present. In this example embodiment, one possible speciation for Mg2+ would be [(PEG)Mg(BH4)]+, where PEG represents a generic polyether chain or chains. These results suggest that exemplary embodiments of PEGylated ionic liquids provide a coordination environment conducive to reversible Mg2+/Mg electrochemistry.

In various embodiments, the source of Mg2+ may comprise Mg(BH4)2, rather than Mg(TFSI)2. As shown above, when Mg(BH4)2, for example, is dissolved in ionic liquids containing TFSI—, some TFSI— coordination will occur. The predominant speciation for Mg2+ may be [Mg(BH4)2TFSI]—. As illustrated, if polyether chains pendent on ionic liquid cations are present, TFSI— will be displaced. If the ratio of ether oxygen's to Mg2+ is sufficiently high, there is also significant displacement of BH4- from the Mg2+ center.

Preparation of a non-limiting exemplary embodiment of the present disclosure may be achieved through use of the following chemicals prepared accordingly. Lithium bis(trifluorosulfonyl)imide (99.5% TCI America), sodium iodide (99.5% EMD Millipore), 4-toluensulfonyl chloride (≥98% Oakwood Chemical), iodobutane (synthetic grade EMD Millipore), isopropyl alcohol (IPA) (99.7% Alfa Aesar), triethylene glycol monomethyl ether (?97% Sigma Aldrich), sodium thiosulfate (99%. Sigma Aldrich), activated carbon (decolorizing, Sigma Aldrich) and methoxypolyethylene glycol M.W. 350 (reagent grade Sigma Aldrich) may be used as received. Prior to use in their respective reactions, ethyl acetate (99.5% BDH), N-methyl pyrrolidine (97% Sigma Aldrich), pyridine (≥99% Sigma Aldrich) and dichloromethane (reagent grade BDH) may be distilled over $CaH_2$. Acetone (Sigma Aldrich) may be dried via 3 Å molecular sieves prior to a single distillation before use. Toluene (Lab Chem Inc.) may be distilled over sodium and benzophenone prior to use.

In at least one non-limiting exemplary embodiment of the present disclosure, 1-(2-(2-(2-Methoxyethoxy)ethoxy)ethyl)-1-methylpyrrolidinium bis(trifluoromethylsulfonyl) imide (MPEG3PyrTFSI) may be synthesized according to a scaled up synthesis taken from Dobbin et al. (Dobbelin, M.; Azcune, I.; Luzuriaga, A. R. De; Genua, A.; Jovanovski, V.; Odriozola, I.; Chem. Mater. 2012, 24, 1583-1590.). Work up of the PEG3I may be best performed using a 5% aqueous solution of sodium thiosulfate, as described below for synthesis of MPEG7PyrTFSI. Synthesis may also differ from the Dobbin technique with the additional step of dissolving the final product in a small volume of IPA and stirring over activated charcoal at 40° C. overnight for purification. In this non-limiting exemplary embodiment, the final product is a lightly yellow-tinted, or clear, liquid. MPEG3PyrTFSI: 1H NMR (400 MHz, $(CD_3)_2CO$): δ 4.06-4.01 (m, 2H, $NCH_2CH_2O$), 3.78-3.74 (m, 6H, $NCH_2$), 3.69-3.65 (m, 2H, $OCH_2CH_2O$), 3.63-3.6 (m, 4H, $OCH_2CH_2O$), 3.58-3.56 (m, 2H, $OCH_2CH_2O$), 3.48-3.45 (m, 2H, $OCH_2CH_2O$), 3.29 (s, 3H, $OCH_3$), 3.28 (s, 3H, $NCH_3$), 2.33-2.27 (m, 4H, $CH_2CH_2$).

In at least one embodiment of the present disclosure, Methoxypolyethylene glycol (M.W. 350) bis(trifluoromethylsulfonyl)imide(MPEG7PyrTFSI) may be synthesized according to the general procedure found in Ganapatibholta et. al. and adapted for pyrrolidinium-based cations as opposed to imidazolium cations. (Ganapatibhotla, L. V. N. R.; Zheng, J.; Roy, D.; Krishnan, S.; Chem. Mater. 2010, 22, 6347-6360.). In at least one exemplary embodiment, 4-toluensulfonyl chloride in dichloromethane may be added dropwise to a solution of methoxypolyethylene glycol M.W. 350 and pyridine in dichloromethane at 0° C. to −10° C. and subsequently allowed to gradually warm back to room temperature as the reaction progresses overnight. After workup of the PEGylated tosyl (PEG7 Ts) product, described by Ganapatibhotla et al., NaI powder may be slowly added to PEG7TS/acetone at room temperature and allowed to react overnight. The PEGylated iodide (PEG7I) product may then be worked up, again as described by Ganapatibhotla et al., by three 50 mL extractions using a 5% aqueous solution of sodium thiosulfate. The PEG7I/toluene may then be added to methylpyrrolidine and allowed to react at room temperature, for example for 2 days. The resulting MPEG7PyrI ionic liquid may then be separated from the toluene organic phase and extracted 3 times with 50 ML or diethyl ether. It may then be dissolved in water and stirred with decolorizing activated carbon overnight. Finally, after filtering the carbon, the MPEG7PyrI may be combined with LiTFSI in water to give MPEG7PyrTFSI. The MPEG7PyrTFSI may be diluted with IPA and stirred in activated charcoal at 40° C. overnight for final purification. The ionic liquid may then be dried, for example at 80° C., under 0.4 mTorr vacuum, for ≥17 hours prior to use. According to this embodiment, the final product was a clear liquid. MPEG7PyrTFSI: 1H NMR (400 MHz, $(CD_3)_2CO$): δ 4.10-4.05 (m, 2H, $NCH_2CH_2O$), 3.79-3.77 (m, 6H, $NCH_2$), 3.70-3.68 (m, 2H, $OCH_2CH_2O$), 3.63-3.6 (m, 4H, $OCH_2CH_2O$), 3.58-3.56 (m, 2H, $OCH_2CH_2O$), 3.48-3.45 (m, 2H, $OCH_2CH_2O$), 3.29 (s, 3H, $OCH_3$), 3.28 (s, 3H, $NCH_3$), 2.33-2.27 (m, 4H, $CH_2CH_2$).

FIG. 1A shows the spectrum for an exemplary embodiment of the present disclosure comprising an ionic liquid containing $Mg(BH_4)_2$ dissolved at various mole fractions in BMPyrTFSI. Raman bands are observed at 2200 cm-1 and 2363 cm-1. The spectrum in FIG. 1A illustrates that all $BH_4-$ anions are coordinated in a bidentate fashion to the $Mg^{2+}$ cation. These same spectral features are observed over a range of mole fractions of $Mg(BH_4)_2$ from 0.05 to 0.35, indicating that $BH_4-$ coordination at $Mg^{2+}$ may not change over that range.

FIG. 1B shows the same spectral region for an additional exemplary embodiment comprising an ionic liquid containing $Mg(BH_4)_2$ dissolved in MPEG3PyrTFSI, over a range of mole fractions. An additional Raman band is observed at 2254 cm-1. This band is more intense, relative to the B-Hb and B-Ht bands, at low mole fractions of $Mg(BH_4)_2$.

FIG. 1C shows the same spectral region for an exemplary embodiment comprising an ionic liquid containing $Mg(BH_4)_2$ dissolved in MPEG7PyrTFSI. A similar band is observed over the entire mole fraction range explored. The band intensity is higher relative to the B-Hb and B-Ht bands at lower mole fraction of $Mg(BH_4)_2$. This band may be due to "free" $BH_4-$ (i.e. not coordinated to $Mg^{2+}$).

Figure 2:
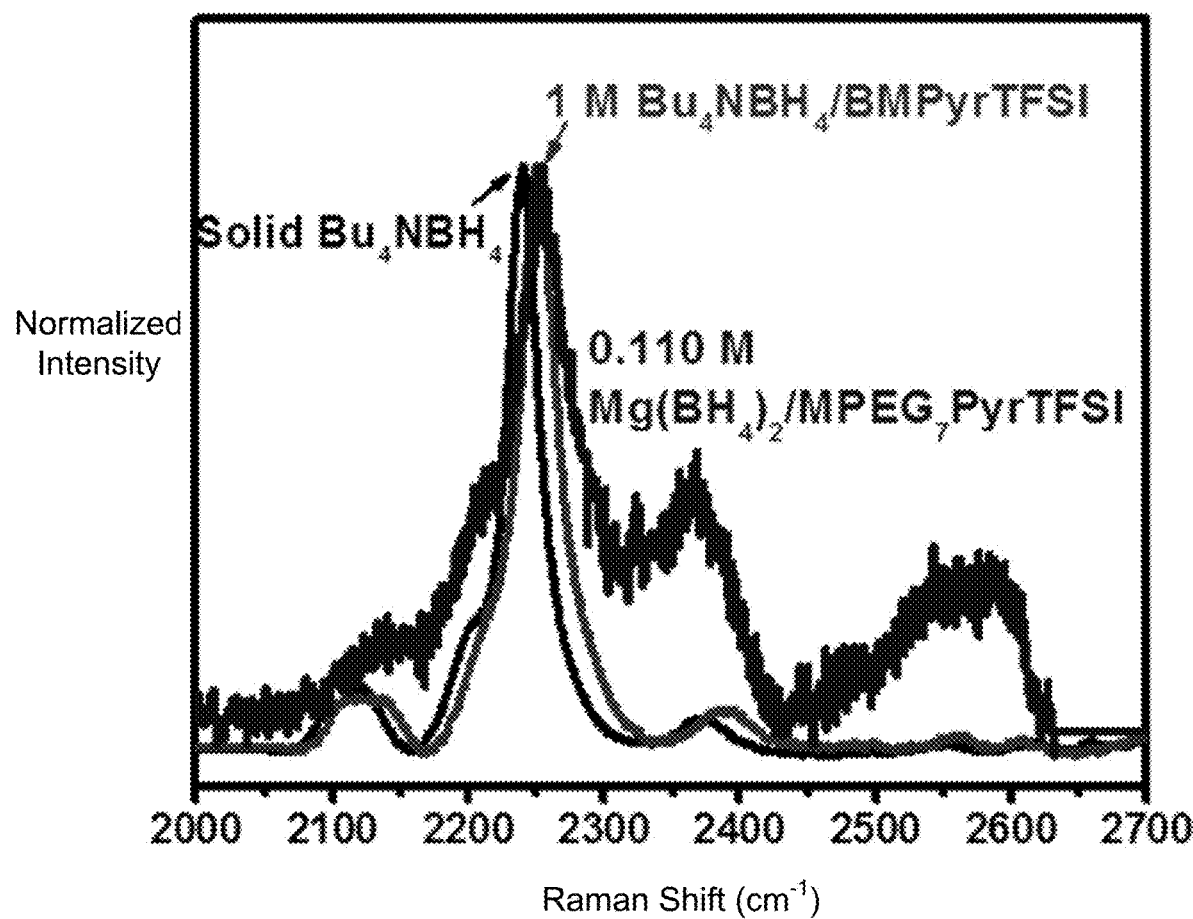
FIG. 2 illustrates Raman spectra for solid Bu4NBH4, 1 M Bu4NBH4/BMPyrTFSI, and 0.110 M Mg(BH4)2/MPEG7PyrTFSI, each spectrum normalized to its most intense peak, in accordance with various embodiments.

FIG. 2 illustrates the Raman spectrum of an exemplary embodiment comprising solid tetrabutylammonium borohydride ($Bu_4NBH_4$), 1 M $Bu_4NBH_4$ dissolved in BMPyrTFSI and 0.110 M $Mg(BH_4)_2$ dissolved in MPEG7PyrTFSI. As shown, solid $Bu_4NBH_4$ shows a peak at 2250 cm-1. 1 M $Bu_4NBH_4$ in BMPyrTFSI gives a peak at 2254 cm-1, as does 0.110 M (x=0.05) $Mg(BH_4)_2$ in MPEG7PyrTFSI. These results show that some $BH_4-$ is displaced from the $Mg^{2+}$ center in these PEGylated ionic liquids, with the extent of displacement increasing with the length of the polyether chain. This is consistent with conclusions from previous studies of $Mg(BH_4)_2$ in glyme solvents, and in a polyethylene oxide polymer matrix, which also suggested that some $BH_4-$ dissociation was being caused by complexation from ether oxygens. This displacement of $BH_4-$ impacts the electrochemical deposition/dissolution of the $Mg^{2+}/Mg$ redox couple, generally improving the electrochemical behavior.

As shown by a comparison of FIGS. 1B and 1C, longer PEG chains in the latter are more effective at inducing displacement of the $BH_4-$, as judged by the much more intense band for free $BH_4-$ in MPEG7PyrTFSI.

Figure 3A:
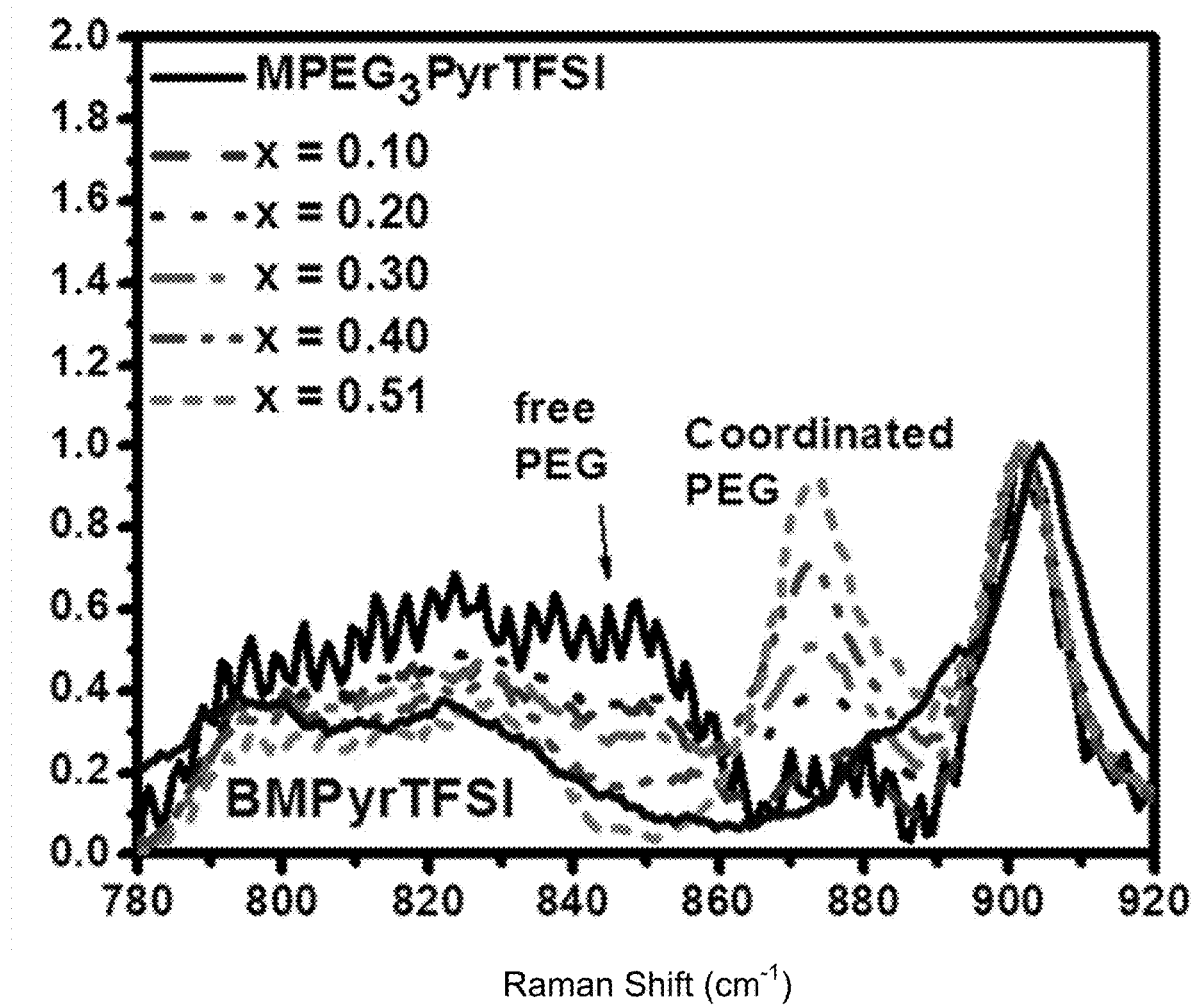
FIG. 3A illustrates C—O—C stretching and CH2 rocking regions for [Mg(BH4)2]x[MPEG3PyrTFSI]1-x, each spectrum normalized to its respective ca. 902 cm-1 (Pyr+) peak, in accordance with various embodiments.
Figure 3B:
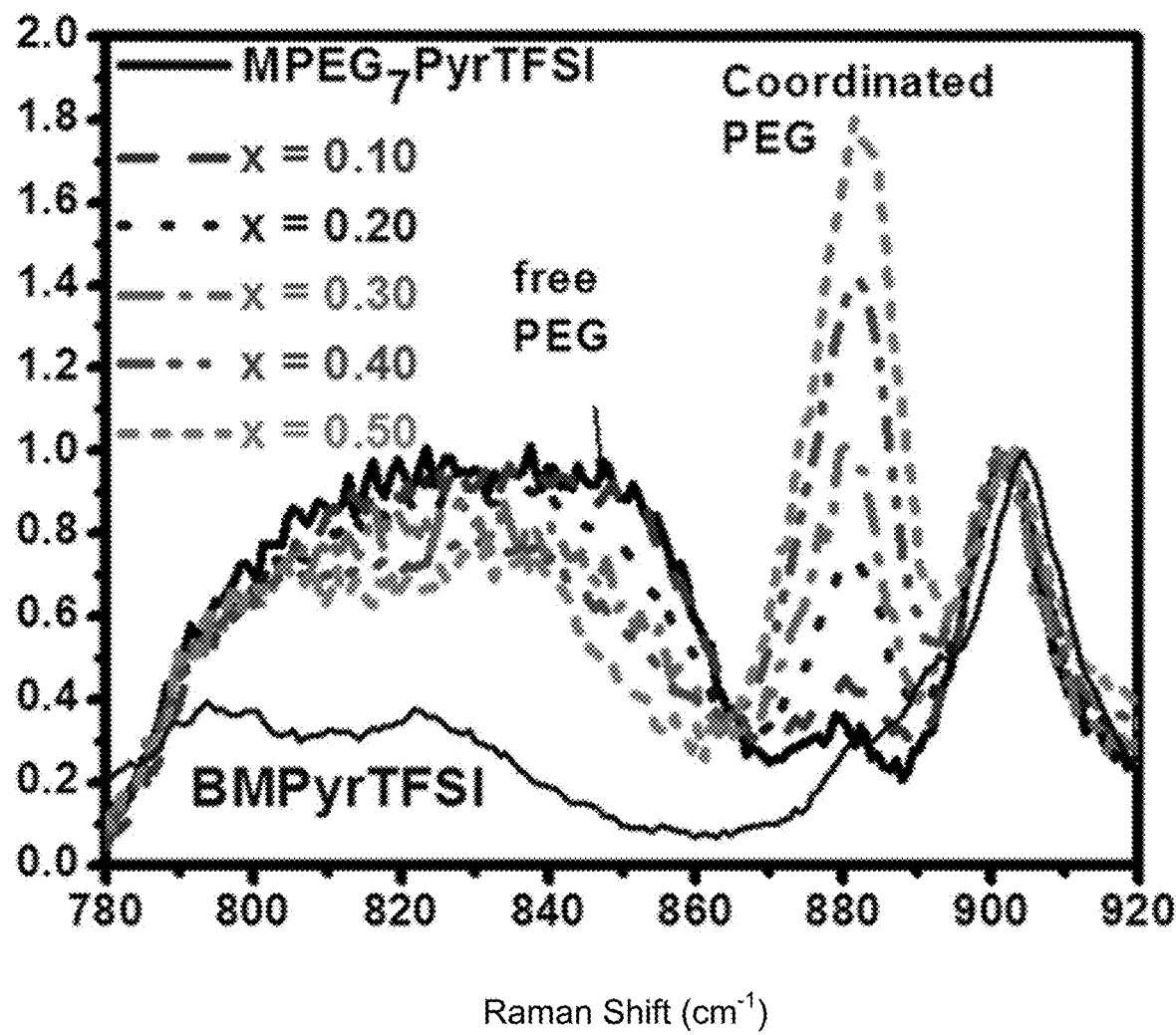
FIG. 3B illustrates C—O—C stretching and CH2 rocking regions for [Mg(BH4)2]x[MPEG7PyrTFSI]1-x, each spectrum normalized to its respective ca. 902 cm-1 (Pyr+) peak, in accordance with various embodiments.

FIG. 3A and FIG. 3B illustrate the spectral region bands associated with $CH_2$ rocking and C—O—C stretching modes for the PEG-ionic liquid systems. For example, during analysis of this region as a function of $Mg(BH_4)_2$ mole fraction (x) in $[Mg(BH_4)_2]_x[MPEGmPyrTFSI]_{1-x}$ solutions. At more dilute concentrations of $Mg(BH_4)_2$, and in the pure PEG-IL, the dominant bands are those that make up the broad feature from 780 to 860 cm-1. These vibrational modes are attributed to the non-coordinating (free) PEG chains. The peak arising at 875 cm-1 is produced when the PEG chains are coordinated to $Mg^{2+}$. $Mg^{2+}$ coordination also causes the broad feature due to vibrations from unbound polyether C—O—C groups to decrease. The present results show that the PEG chains do in fact chelate the $Mg^{2+}$ species, despite the close proximity of the positive charge from the parent pyrrolidinium moiety.

Figure 4A:
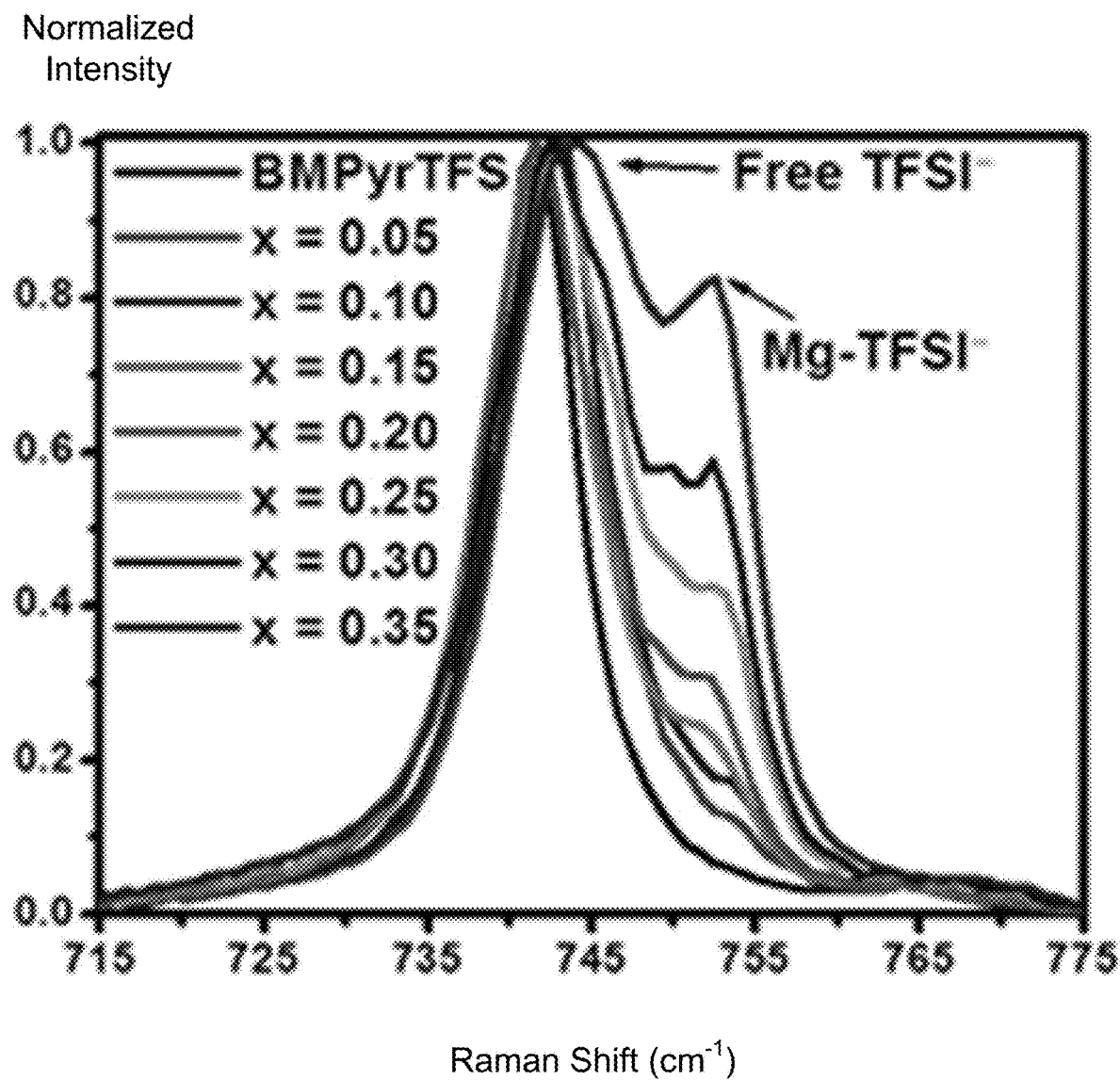
FIG. 4A illustrates Raman spectra for [Mg(BH4)2]x[BMPyrTFSI]1-x electrolytes, in accordance with various embodiments.
Figure 4B:
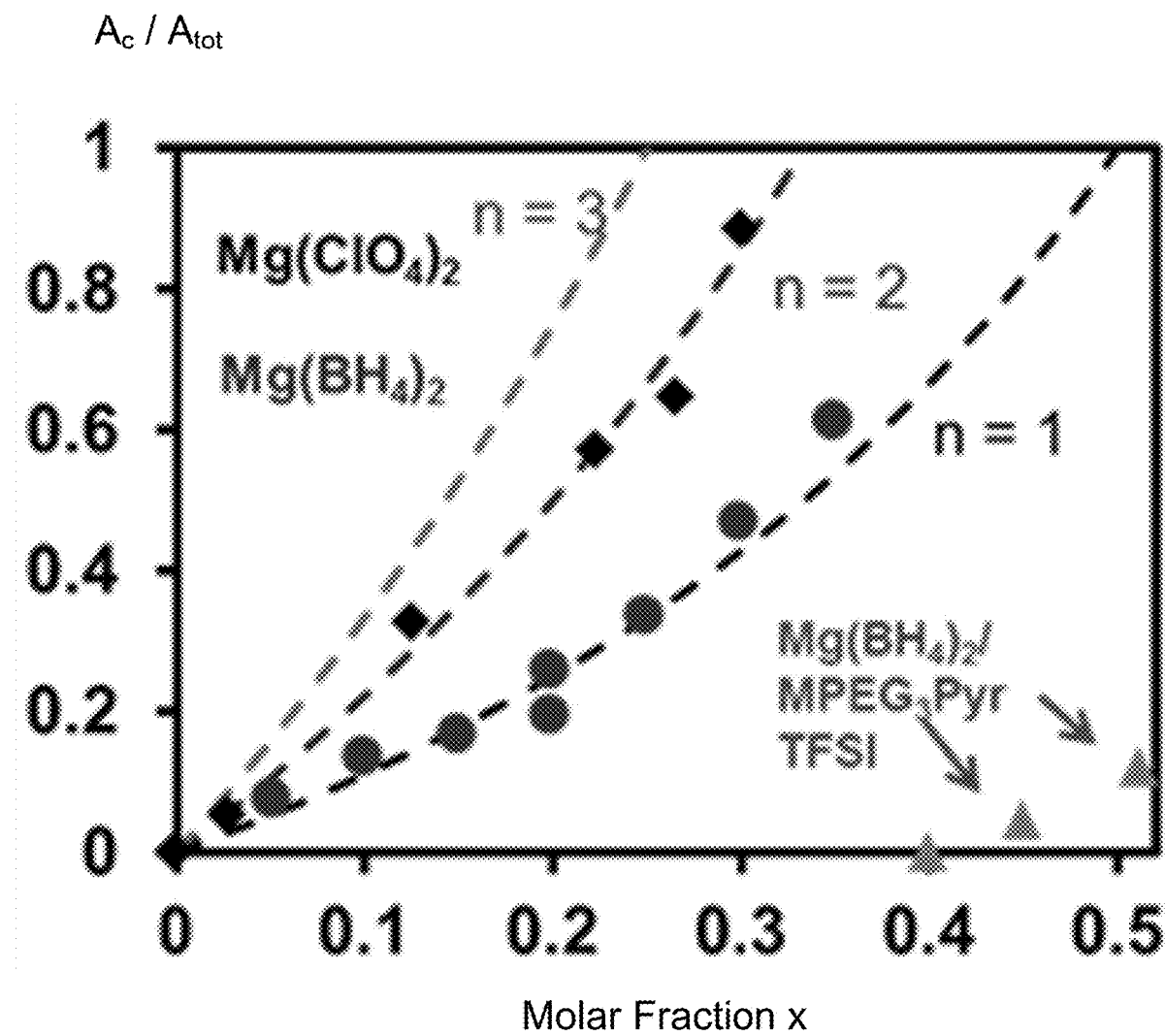
FIG. 4B illustrates fraction of TFSI— in coordination with Mg2+(Ac/Atot) as a function of the molar fraction (x) of Mg(BH4)2 or Mg(ClO4)2 in BMPyrTFSI, and values for high concentration Mg(BH4)2/MPEG3PyrTFSI electrolytes, in accordance with various embodiments.

FIG. 4A and FIG. 4B illustrate the coordination of TFSI— at $Mg^{2+}$ in various ionic liquids. For example a band at 742 cm-1 is attributed to free (non-metal ion coordinating) TFSI—, and a band at 752 cm-1 is attributed to $Mg^{2+}$ coordinated TFSI—. As shown, in FIG. 4A, the 752 cm-1 band attributed to TFSI— coordinated to $Mg^{2+}$ increases as the Mg(BH4)2 mole fraction is increased in the BMPyrTFSI ionic liquid. This shows that TFSI— coordinates to Mg2+ under these conditions. FIG. 4B shows a plot derived from these data giving the fraction of coordinated TFSI— versus mole fraction of Mg(BH4)2. The data for Mg(BH4)2 agree with the n=1 curve, showing that one TFSI— coordinates to Mg2+ under these conditions. This is consistent with a speciation for Mg2+ of [Mg(BH4)2TFSI]— in this medium. This speciation is consistent with the data in FIG. 1A above showing that, under these conditions, all BH4-species are involved in bidentate contact ion pair coordination with Mg2+.

Figure 5:
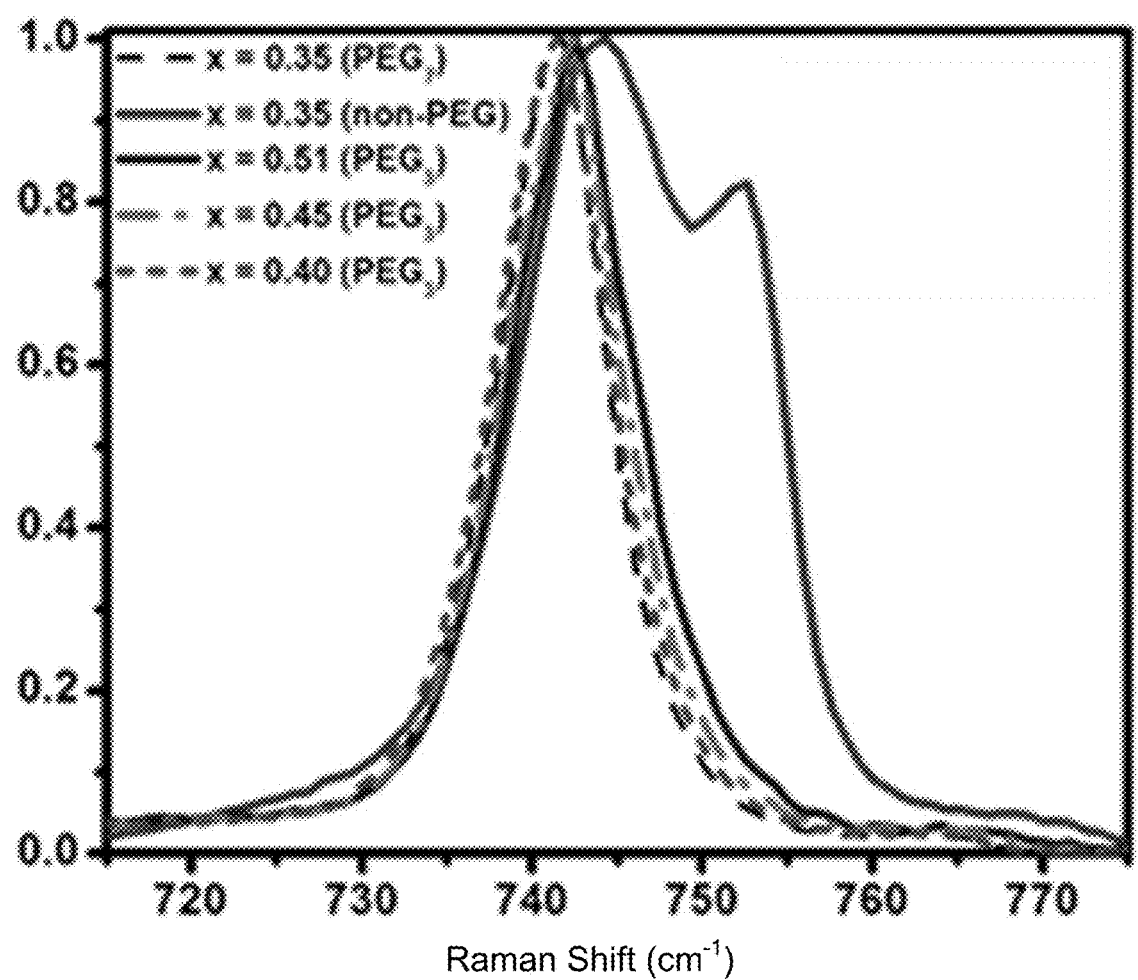
FIG. 5 illustrates Raman spectra comparing electrolytes with given mole fractions of Mg(BH4)2 in different ionic liquid systems, in accordance with various embodiments.

FIG. 5 illustrates spectra for various embodiments of the present disclosure. As shown, no evidence for coordinated TFSI— is observed for any of these cases except BMPyrTFSI, showing that higher concentrations of Mg2+ species can be obtained in these media without inducing TFSI— coordination. The suppression of TFSI— coordination at Mg2+ in these PEGylated ionic liquids provides some protection against TFSI— fragmentation under reducing conditions, which improves the electrochemical performance of Mg cycling.

Figure 6:
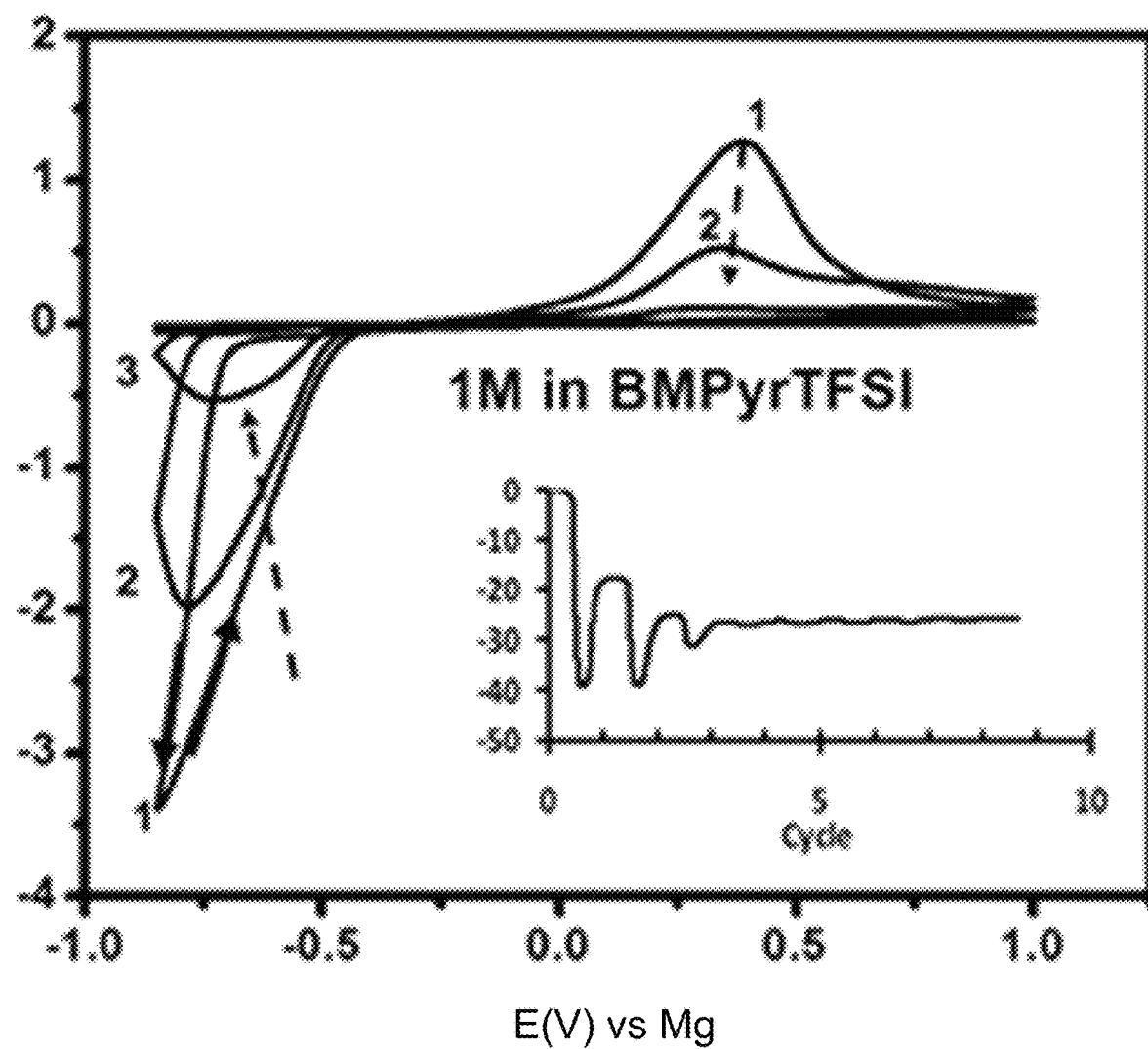
FIG. 6 illustrates successive cyclic voltammograms for 1 M Mg(BH4)2/BMPyrTFSI, at 25 mV/s, and charge as a function of the cycle number, in accordance with various embodiments.

FIG. 6 illustrates repetitive cyclic voltammograms for Mg deposition/dissolution for a solution of Mg(BH4)2 in BMPyrTFSI along with a plot of charge versus cycle number.

Figure 7A:
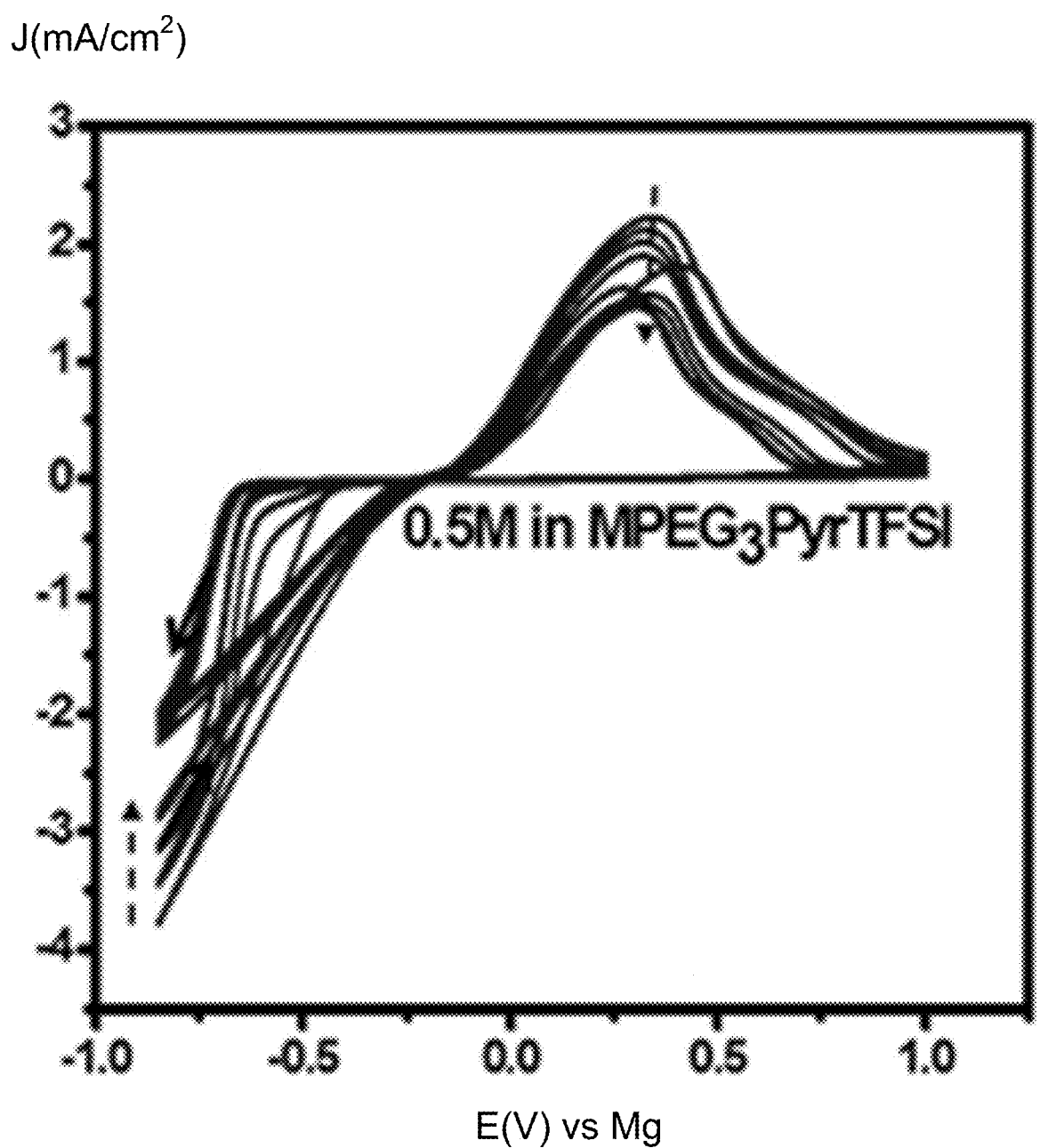
FIG. 7A illustrates successive cyclic voltammograms for 0.5 M Mg(BH4)2/MPEG3PyrTFSI, at 25 mV/s, and charge as a function of the cycle number, in accordance with various embodiments.
Figure 7B:
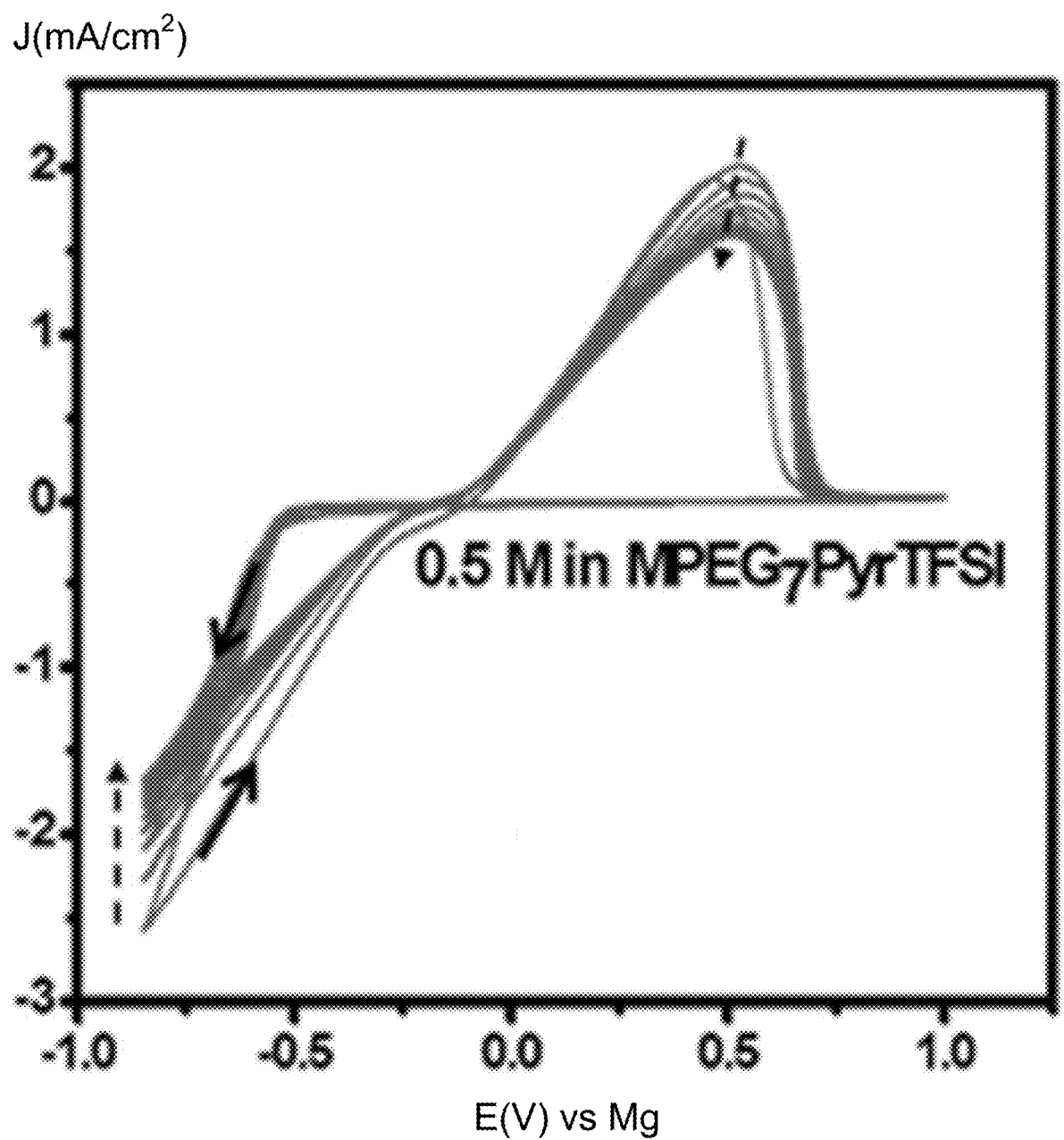
FIG. 7B illustrates successive cyclic voltammograms for 0.5 M Mg(BH4)2/MPEG7PyrTFSI at 25 mV/s, and charge as a function of the cycle number, in accordance with various embodiments.

FIGS. 7A and 7B illustrate the cyclic voltammograms for electrochemical deposition/dissolution of Mg from Mg(BH4)2 in solutions of MPEG3TFSI ionic liquid (FIG. 7A), and of MPEG7TFSI ionic liquid (FIG. 7B), along with plots of charge versus cycle number for the first ten cycles. The room temperature conductivities for these solutions were 0.5±0.1 mS/cm2, 0.38±0.01 mS/cm2 for the 1 M Mg(BH4)2/BMPyrTFSI, 0.5 M Mg(BH4)2/MPEG3PyrTFSICVs and 0.24-0.02 mS/cm2 for the 0.5 M Mg(BH4)2/MPEG7PyrTFSI.

Figure 8:
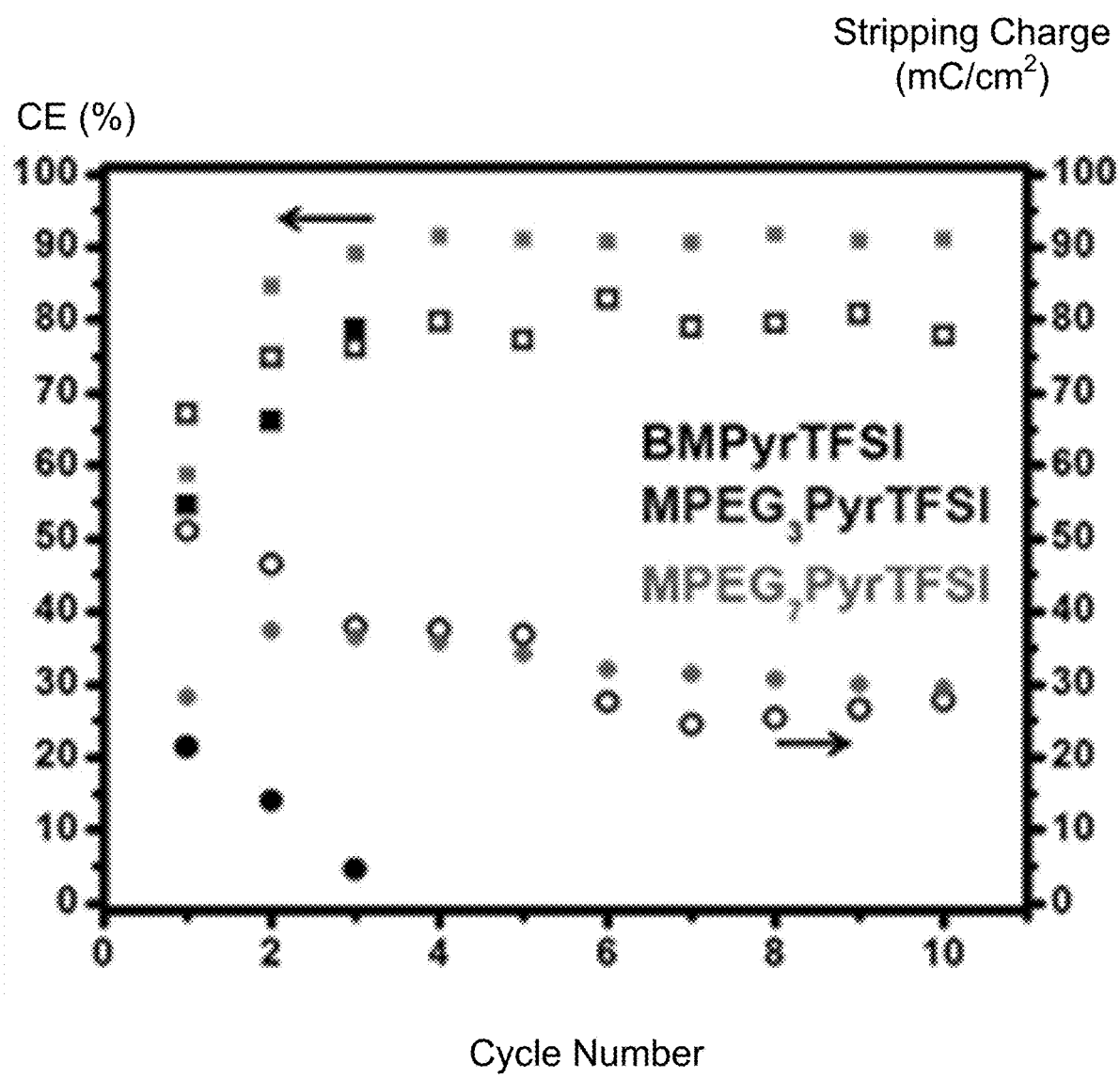
FIG. 8 illustrates coulombic efficiencies and stripping charges for each cycle in the given systems of FIGS. 6, 7A, and 7B, in accordance with various embodiments.

FIG. 8 illustrates plots of coulombic efficiency and stripping charge versus cycle number for solutions of Mg(BH4)2 in BMPyrTFSI, of Mg(BH4)2 in MPEG3TFSI ionic liquid, and of Mg(BH4)2 in MPEG7TFSI ionic liquid. These results indicate an improvement in reversibility of the deposition process. In various embodiments, application of principles of the present disclosure may result in unexpected results, including improved electrochemical performance and increased coulombic efficiency. Increased coulombic efficiency may be due to displacement of TFSI— from the Mg2+ center to prevent unwanted reactions of TFSI—. Increased coulombic efficiency may be due to the elimination of trace water in the electrolyte. Increased coulombic efficiency may be due to production of cationic speciation for Mg2+ and the favorable impact of this on transport, facilitating electromigration toward the Mg electrode under deposition conditions and away from it under dissolution conditions.

Figure 9:
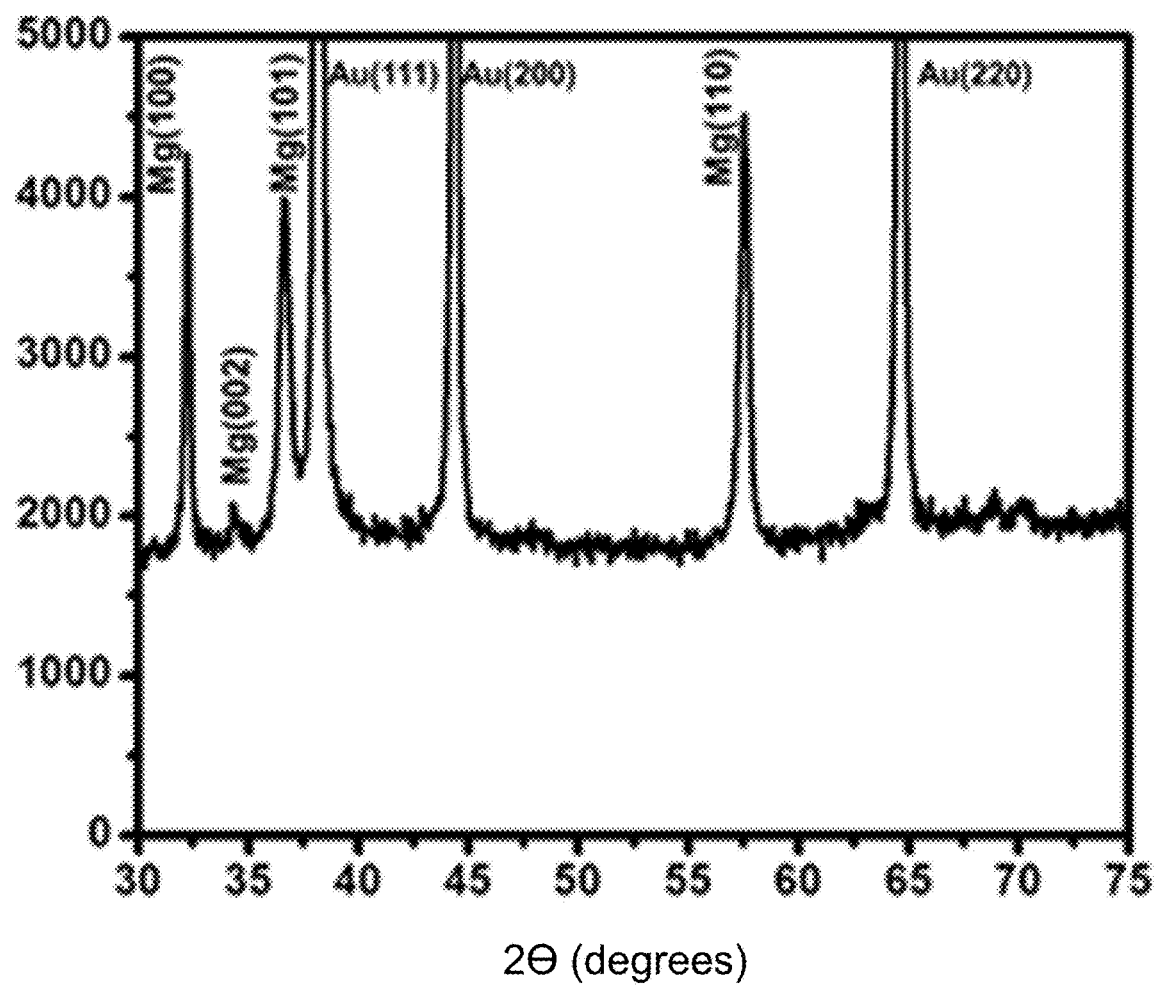
FIG. 9 illustrates an x-ray diffraction (XRD) pattern showing Mg deposit and Au substrate peaks, in accordance with various embodiments.

FIG. 9 illustrates XRD for the deposit under conditions of an exemplary embodiment used in a solution of Mg(BH4)2 in MPEG7TFSI ionic liquid. The XRD pattern reveals the Mg(002) diffraction peak is much weaker than the Mg(100), Mg(101) and Mg(110) peaks. The Au Kα peaks from the substrate are far more intense than the Mg peaks and are cut off before their respective peak intensities. The XRD demonstrates deposition of metallic Mg, with no evidence for other phases being present.

FIGS. 10A, 10B, and 10C illustrate successively closer views of an exemplary deposit obtained by SEM. FIG. 10C gives a good representation of the Mg surface morphology which appears to be relatively smooth, without sign of dendritic growths. FIG. 10D illustrates the EDS spectrum from an area in which no underlying Au substrate is exposed. A very strong Mg peak is observed along with a very weak O peak from the native oxide on the Mg surface, consistent with Mg deposition and absence of oxide precipitation or competing reduction processes such as TFSI— reduction, which leads to surface fouling.

Figure 11A:
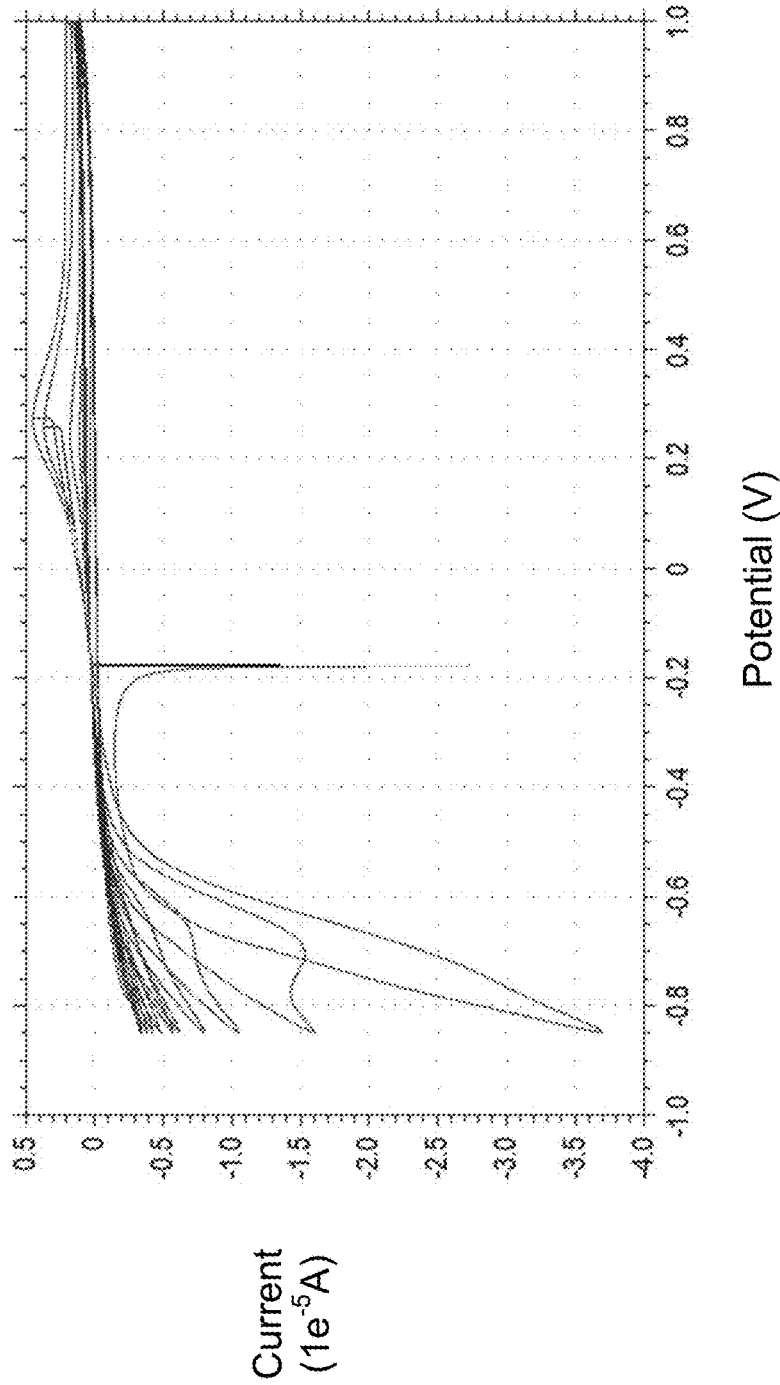
FIG. 11A illustrates successive cyclic voltammograms for 20 mg Mg(BH4)2 in 1 mL BMPyrTFSI, at 50 mV/s, in accordance with the prior art.
Figure 11B:
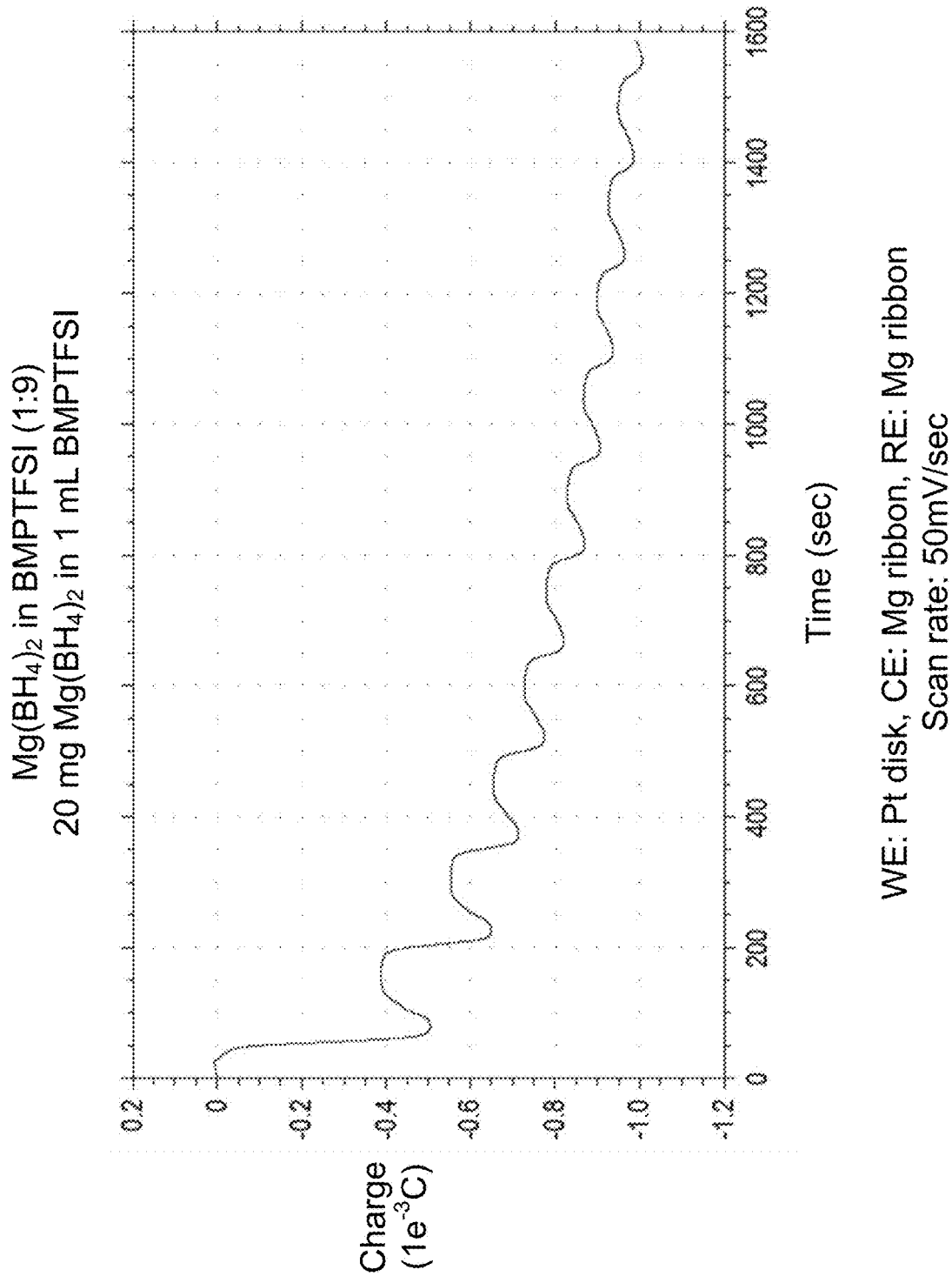
FIG. 11B illustrates charge as a function of the cycle number for 20 mg Mg(BH4)2 in 1 mL BMPyrTFSI, at 50 mV/s, in accordance with the prior art.

FIG. 11A illustrates the cyclic voltammogram for electrochemical deposition/dissolution of 20 mg Mg in 1 mL BMPryTFSI, a typical ionic liquid. FIG. 11B illustrates the accumulated charge for the continuous sequence of dissolution and deposition cycles shown in FIG. 11A as a function of the cycle number. These figures indicate that the charge per cycle decreases with cycle number and the total accumulated reductive charge increases with cycle number, leading to low coulombic efficiency and preventing reversible cycling of the anode. Referring to FIG. 11B, on the first deposition, the charge decreases from about 0 to about −0.5 millicoulomb (mC). Reductive charge accumulation stops at around 80 seconds. At this point the cycle is at positive potentials, so Mg dissolution should be happening. In a perfectly reversibly dissolution, the oxidative charge should go back to zero. However, FIG. 11B shows charge reversal to a cumulative charge of around −0.4 mC. Thus, about 0.1 mC of the 0.5 mC reductive charge is reversibly extracted (giving a coulombic efficiency of about 20%°).

Figure 12A:
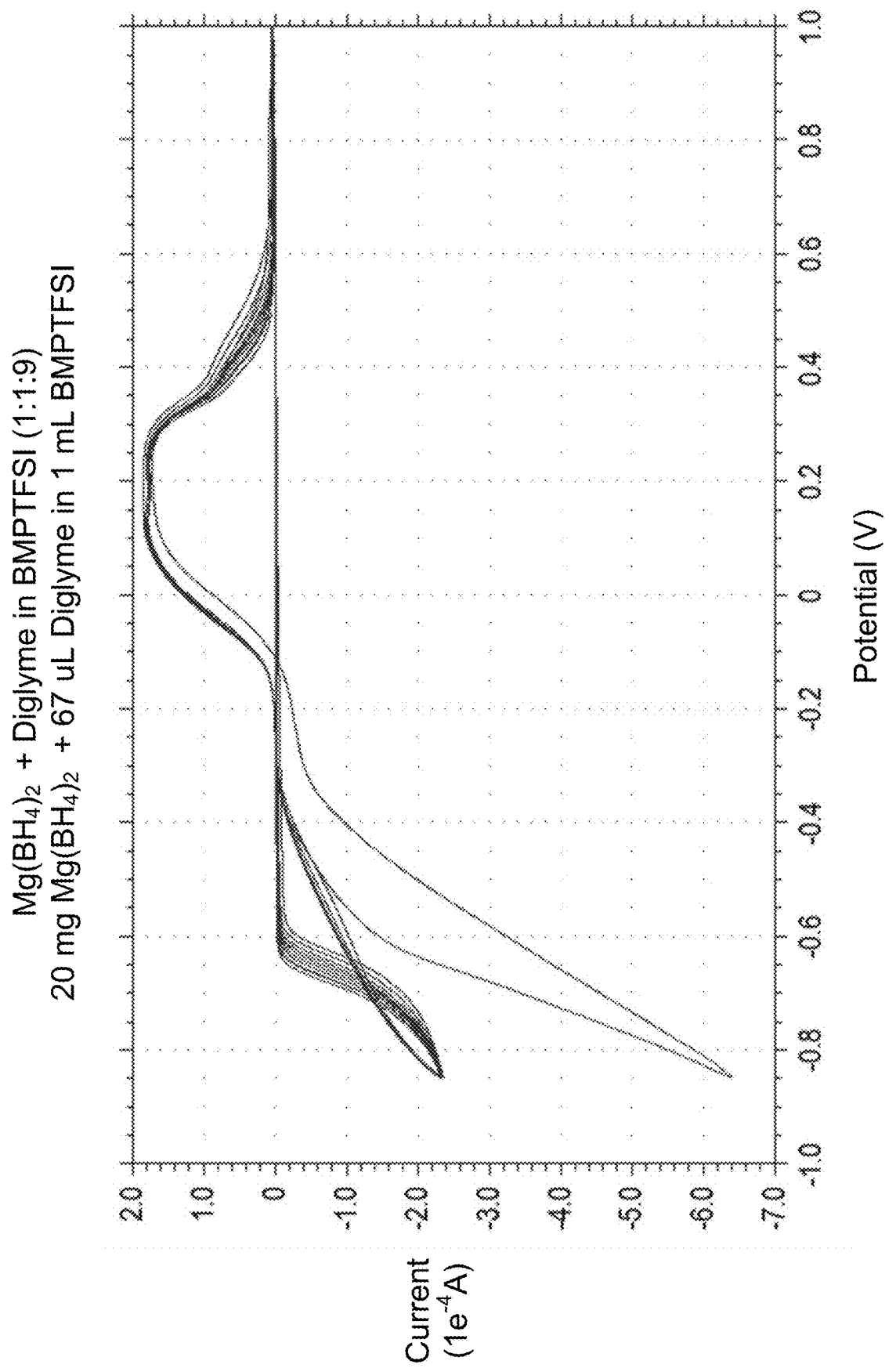
FIG. 12A illustrates successive cyclic voltammograms for 20 mg Mg(BH4)2 and 67 µL diglyme in 1 mL BMPyrTFSI, at 50 mV/s, in accordance with various embodiments.
Figure 12B:
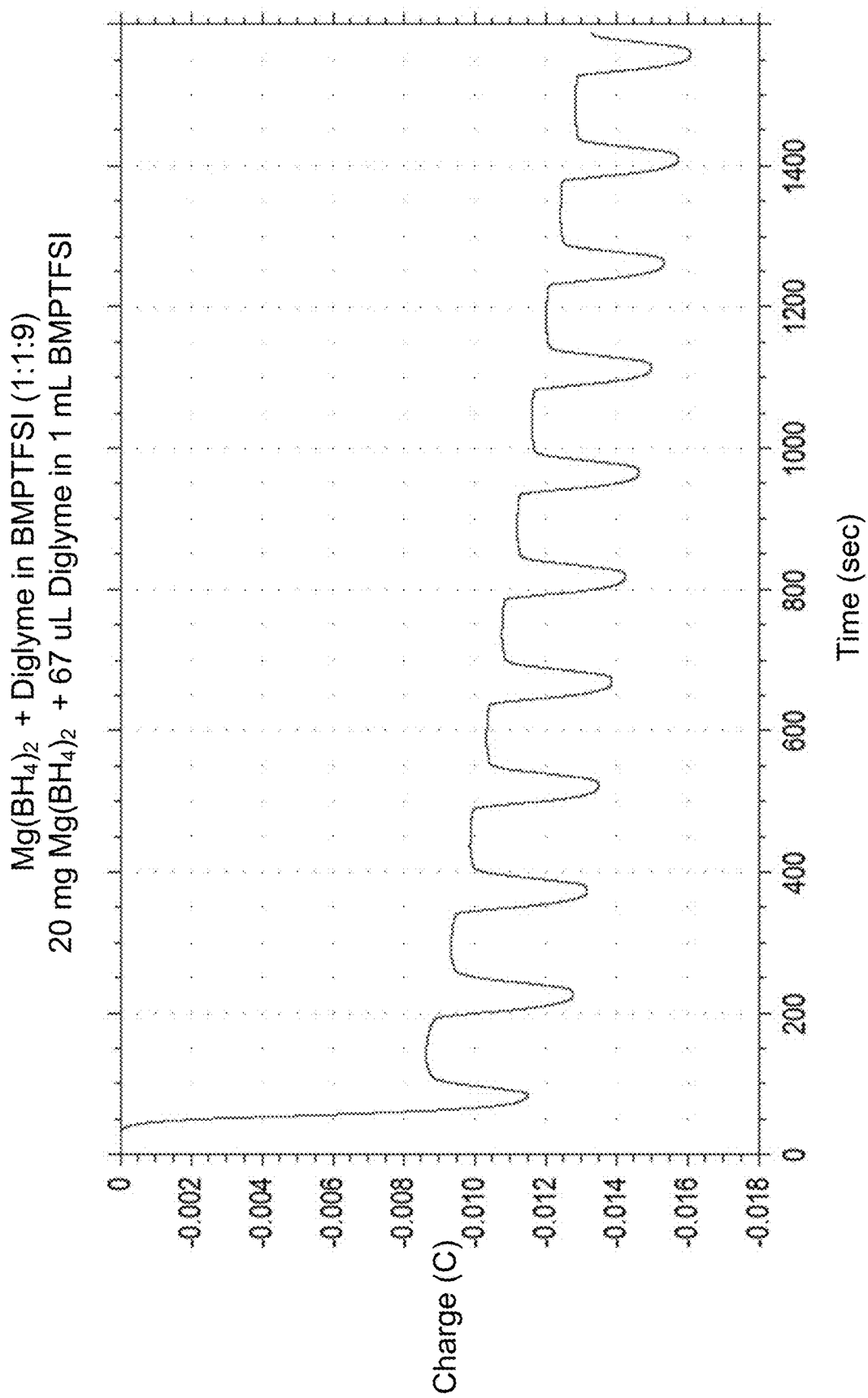
FIG. 12B illustrates charge as a function of the cycle number for 20 mg Mg(BH4)2 and 67 µL diglyme in 1 mL BMPyrTFSI, at 50 mV/s, in accordance with various embodiments.

FIG. 12A illustrates the cyclic voltammogram for electrochemical deposition/dissolution of 20 mg Mg in 1 mL BMPryTFSI, with the addition of 67 μL diglyme. FIG. 12B illustrates the accumulated charge for the continuous sequence of dissolution and deposition cycles shown in FIG. 12A as a function of the cycle number. These figures demonstrate improved coulombic efficiency over the prior art. Moreover, the maximum charge per cycle does not change significantly after the first reductive scan and the total accumulated change increase at a rate slower than the prior art. In various embodiments, the diglyme may complex with Mg2+ and/or the Mg2+ intermediate, which is produced during reduction of Mg2+ by a first electron. This complexation may inhibit the reaction of Mg+ with electrolyte components, such as TFSI; such complexation may lead to decomposition of the electrolyte, fouling of electrode surfaces, and/or irreversible charge loss during cycling.

Figure 13A:
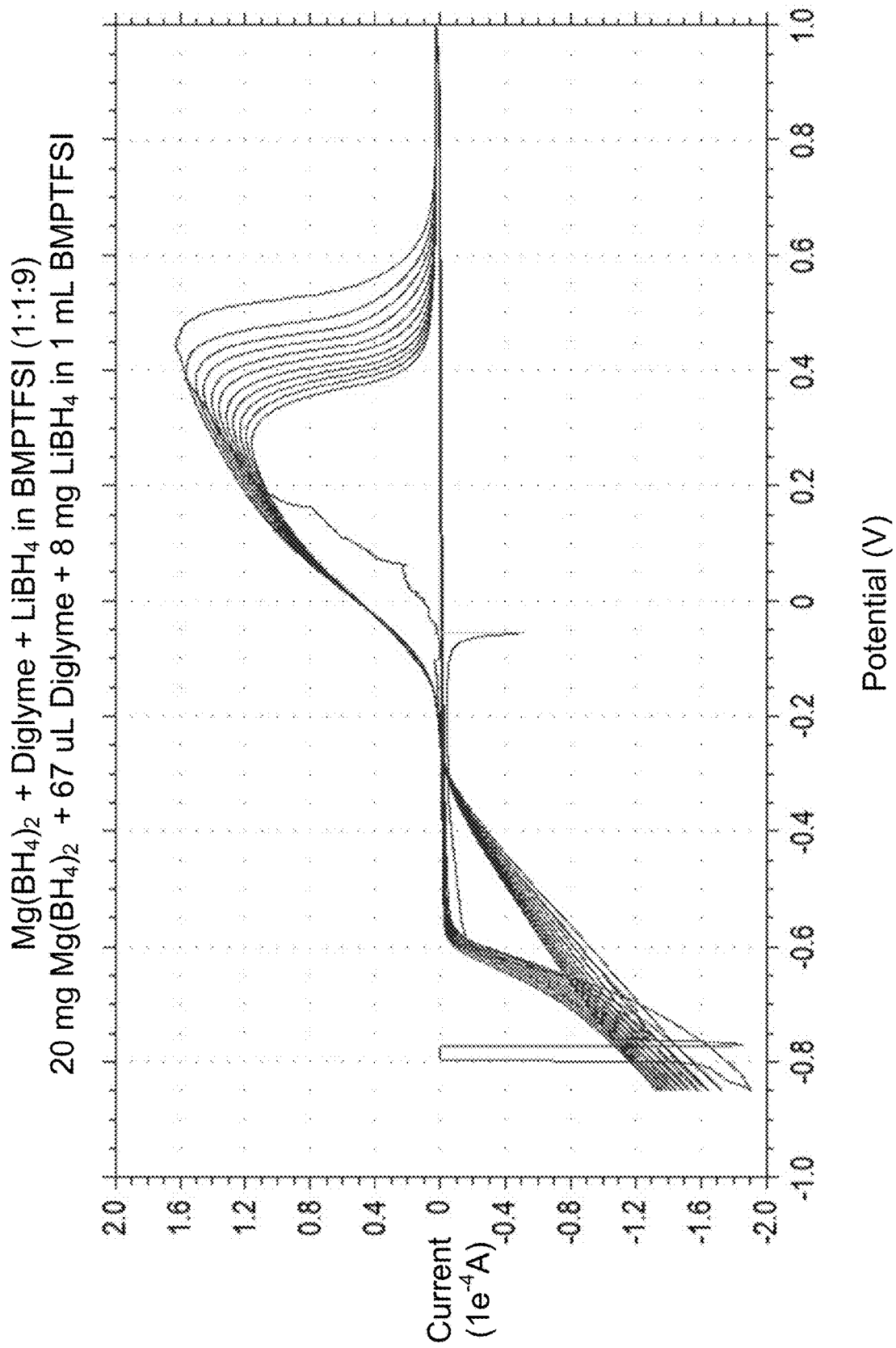
FIG. 13A illustrates successive cyclic voltammograms for 20 mg Mg(BH4)2, 67 µL diglyme, and 8 mg LiBH4, in 1 mL BMPyrTFSI, at 50 mV/s, in accordance with various embodiments.
Figure 13B:
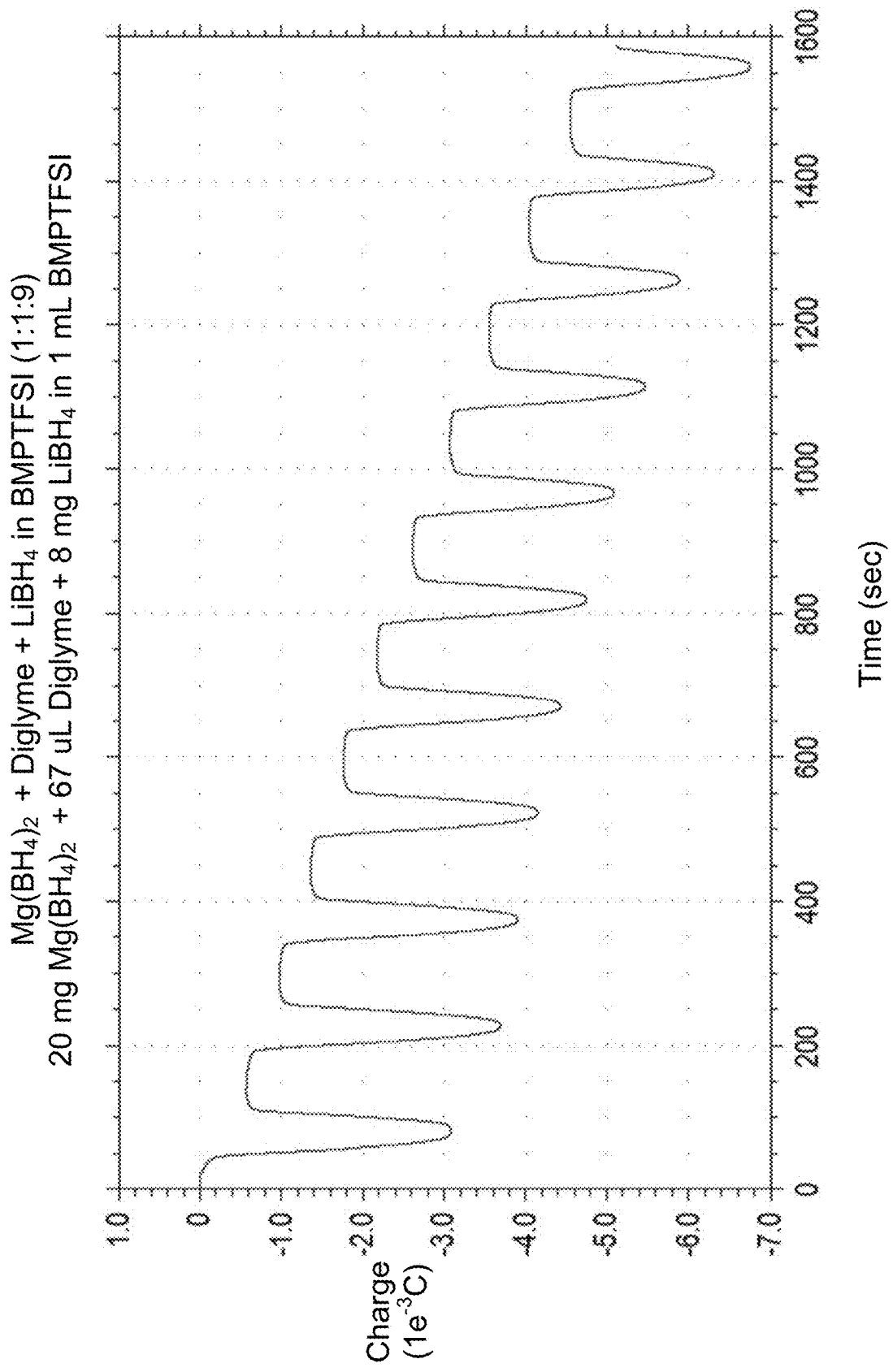
FIG. 13B illustrates charge as a function of the cycle number for 20 mg Mg(BH4)2, 67 µL diglyme, and 8 mg LiBH4, in 1 mL BMPyrTFSI, at 50 mV/s, in accordance with various embodiments.

FIG. 13A illustrates the cyclic voltammogram for electrochemical deposition/dissolution of 20 mg Mg in 1 mL BMPryTFSI, with the addition of 67 μL diglyme and 8 mg of LiBH4. FIG. 13B illustrates the accumulated charge for the continuous sequence of dissolution and deposition cycles shown in FIG. 13A as a function of the cycle number. These figures demonstrate a decrease, as compared to the prior art, in the loss of reductive charge during the first cycle.

Figure 14A:
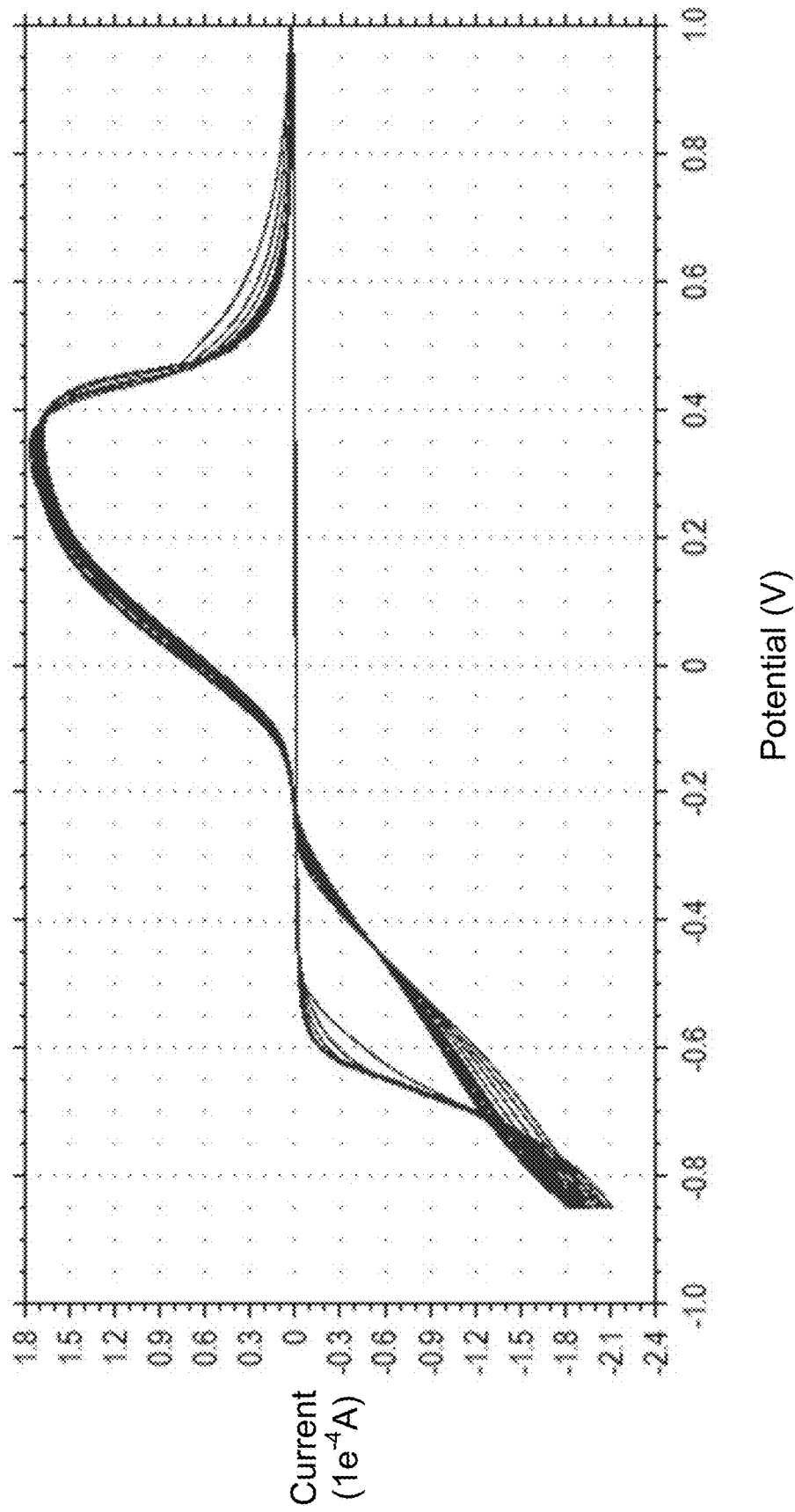
FIG. 14A illustrates successive cyclic voltammograms for 20 mg Mg(BH4)2, 67 µL diglyme, and 50 mg Bu4NBH4, in 1 mL BMPyrTFSI, at 50 mV/s, in accordance with various embodiments.
Figure 14B:
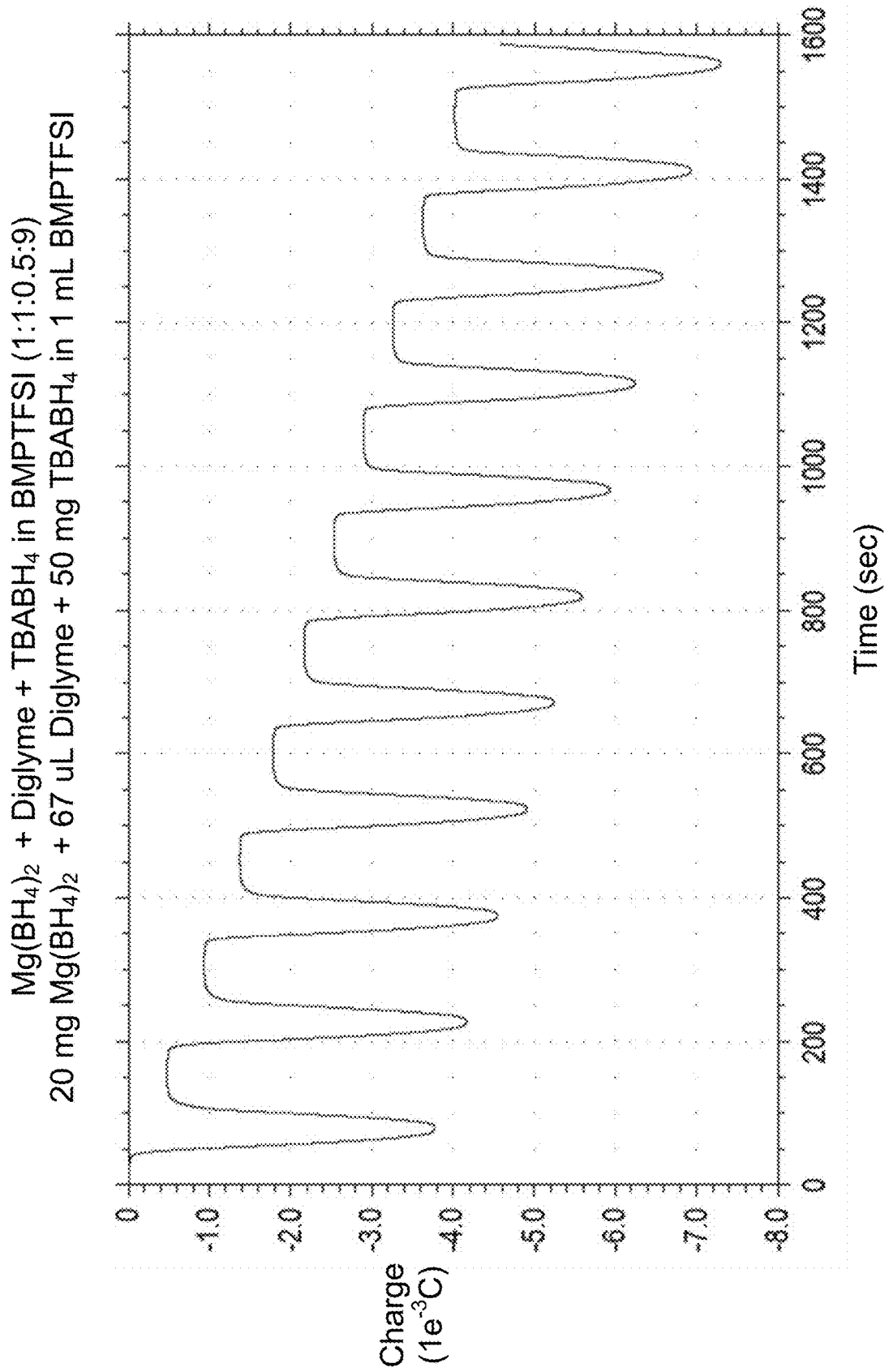
FIG. 14B illustrates charge as a function of the cycle number for 20 mg Mg(BH4)2, 67 µL diglyme, and 50 mg Bu4NBH4, in 1 mL BMPyrTFSI, at 50 mV/s, in accordance with various embodiments.

FIG. 14A illustrates the cyclic voltammogram for electrochemical deposition/dissolution of 20 mg Mg in 1 mL BMPryTFSI, with the addition of 67 μL diglyme and 50 mg Bu4NBH4. FIG. 14B illustrates the accumulated charge for the continuous sequence of dissolution and deposition cycles shown in FIG. 14A as a function of the cycle number. These figures demonstrate a decrease, as compared to the prior art, in the loss of reductive charge during the first cycle.

Referring now to FIGS. 13A, 13B, 14A, and 14B, in various embodiments, the cation of the borohydride salt may not be chemically involved in the processes that inhibit loss of initial reductive charge. In various embodiments, the anion, for example borohydride, may act as a water scavenger. In various embodiments, the electrolyte may contain trace levels of water. Water may also be a contaminant in a salt, solvent and/or other chemical component of a magnesium battery. In various embodiments, this water reacts with Mg metal that has been electrodeposited. This reaction may produce magnesium oxide (MgO). In various embodiments, production of MgO at the Mg metal interface may cause passivation of the interface, with this passivation leading to loss of charge recovery during cycling. In various embodiments, the presence of an anion, such as borohydride, may decrease the water concentration to extremely low levels, thereby preventing the undesirable loss of reductive charge. Accordingly, in various exemplary embodiments, exemplary ionic liquids may be configured with a concentration of added BH4- of between about 10 ppm (for example, for use in connection with extremely dry supporting electrolyte media) and about 1,000 ppm (i.e., near the saturation concentration of water in exemplary ionic liquids).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A rechargeable magnesium battery, comprising:
    an anode, a cathode, and a chelating ionic liquid solution in contact with the anode and the cathode, the chelating ionic liquid comprising:
    a cation, wherein the cation comprises N-methoxyPEGm-N-methylpyrrolidinium cations, wherein PEG comprises a polyethylene glycol chain, and m comprises the number of ether oxygen's in the PEG chain;
    an anion; and
    a soluble magnesium salt.

2. The rechargeable magnesium battery of claim 1, wherein the chelating ionic liquid further comprises a polyether chain.

3. The rechargeable magnesium battery of claim 2, wherein a concentration of oxygen atoms in the polyether chain comprises a molar ratio of between 3 and 6 per Mg2+ atom in the chelating ionic liquid.

4. The rechargeable magnesium battery of claim 2, wherein the polyether chain comprises diglyme.

5. The rechargeable magnesium battery of claim 2, wherein the polyether chain comprises a pendant chain coupled to the cation.

6. The rechargeable magnesium battery of claim 1, wherein the anion comprises at least one of bis(trifluoromethylsulfonyl)imide (TFSI), bis(fluorosulfonyl)imide (FSI—), $IIIX_4$-(III=B, Al, Ga, In; X=H, F, Cl, Br, I), $AF_6$-(A=P, As, Sb), imidazole-based anions, sulfonate-based anions, carboxylate-based anions, borate-based anions, carborane-based anions, or cyanamide-based anions.

7. The rechargeable magnesium battery of claim 6, wherein a concentration of $BH_4$— is at least as high as a concentration of water in the chelating ionic liquid.

8. An electrolyte, comprising:
    a cation, wherein the cation comprises N-methoxyPEGm-N-methylpyrrolidinium cations, wherein PEG comprises a polyethylene glycol chain, and m comprises the number of ether oxygen's in the PEG chain;
    an anion; and
    a soluble magnesium salt.

9. The electrolyte of claim 8, further comprising a polyether chain.

10. The electrolyte of claim 9, wherein a concentration of oxygen atoms in the polyether chain comprises a molar ratio of between 3 and 6 per Mg2+ atom in the chelating ionic liquid.

11. The electrolyte of claim 9, wherein the polyether chain comprises diglyme.

12. The electrolyte of claim 9, wherein the polyether chain comprises a pendant chain coupled to the cation.

13. The electrolyte of claim 8, wherein the anion comprises at least one of bis(trifluoromethylsulfonyl)imide (TFSI), bis(fluorosulfonyl)imide (FSI—), $IIIX_4$-(III=B, Al, Ga, In; X=H, F, Cl, Br, I), $AF_6$-(A=P, As, Sb), imidazole-based anions, sulfonate-based anions, carboxylate-based anions, borate-based anions, carborane-based anions, or cyanamide-based anions.

14. The electrolyte of claim 13, wherein a concentration of $BH_4$- is at least as high as a concentration of water in the chelating ionic liquid.

15. An electrolyte comprising:
    a chelating ionic liquid comprising:
        N-methoxyPEGm-N-methylpyrrolidinium cations, wherein PEG comprises a polyethylene glycol chain, and m comprises the number of ether oxygen's in the PEG chain; and
        at least one of bis(trifluoromethylsulfonyl)imide (TFSI), bis(fluorosulfonyl)imide (FSI—), $IIIX_4$-(III=B, Al, Ga, In; X=H, F, Cl, Br, I), $AF_6$-(A=P, As, Sb), imidazole-based anions, sulfonate-based anions, carboxylate-based anions, borate-based anions, carborane-based anions, or cyanamide-based anions; and
    a magnesium salt.

16. The electrolyte of claim 15, wherein the magnesium salt is dissolved in the chelating ionic liquid.

* * * * *

UNITED STATES PATENT AND TRADEMARK OFFICE
CERTIFICATE OF CORRECTION

PATENT NO. : 10,700,382 B2
APPLICATION NO. : 16/181937
DATED : June 30, 2020
INVENTOR(S) : Buttry et al.

Page 1 of 1

It is certified that error appears in the above-identified patent and that said Letters Patent is hereby corrected as shown below:

On the Title Page

As part of Item (63) Related U.S. Application Data, please delete all the existing text and insert as replacement therefor the following text:
--Continuation of application No. 15/942,741, filed on April 2, 2018, now Pat. No. 10,147,971, which is a continuation of application No. PCT/US2016/059712 filed on Oct. 31, 2016.--

Signed and Sealed this
Fifteenth Day of December, 2020

Andrei Iancu
*Director of the United States Patent and Trademark Office*